(12) United States Patent
Brusatore

(10) Patent No.: US 7,559,173 B2
(45) Date of Patent: *Jul. 14, 2009

(54) METHOD AND APPARATUS FOR GROWING PLANTS IN CAROUSELS

(75) Inventor: Nicholas Gordon Brusatore, Port Moody (CA)

(73) Assignee: Terrasphere Systems LLC, Boston, MA (US)

( * ) Notice: Subject to any disclaimer, the term of this patent is extended or adjusted under 35 U.S.C. 154(b) by 46 days.

This patent is subject to a terminal disclaimer.

(21) Appl. No.: 11/808,787

(22) Filed: Jun. 13, 2007

(65) Prior Publication Data

US 2007/0251145 A1 Nov. 1, 2007

Related U.S. Application Data

(63) Continuation-in-part of application No. 11/791,851, filed on May 30, 2007, which is a continuation-in-part of application No. 11/073,562, filed on Mar. 8, 2005, now Pat. No. 7,415,796.

(30) Foreign Application Priority Data

Mar. 7, 2005 (CA) .................................. 2499512
Mar. 7, 2006 (WO) ............... PCT/US2006/007945

(51) Int. Cl.
*A01G 9/02* (2006.01)
*A01G 31/00* (2006.01)
(52) U.S. Cl. ............... 47/82; 47/83; 47/59 R; 47/62 R
(58) Field of Classification Search ........... 47/59 R–63, 47/17, 18, 65, 65.5, 57, 85, 48.5, 79–83, 47/1.3, 66.5, 67, 39
See application file for complete search history.

(56) References Cited

U.S. PATENT DOCUMENTS

| 1,500,917 | A | 7/1924 | Bell |
| 3,254,447 | A | 6/1966 | Ruthner |
| 3,339,308 | A | 9/1967 | Clare |
| 3,529,379 | A | 9/1970 | Ware |
| 3,667,157 | A | 6/1972 | Longhini |

(Continued)

FOREIGN PATENT DOCUMENTS

CA 2343254 C 3/2002

(Continued)

OTHER PUBLICATIONS

PCT International Search Report and the Written Opinion dated May 8, 2007 (10 pp.).

(Continued)

*Primary Examiner*—Andrea M Valenti
(74) *Attorney, Agent, or Firm*—Dinesh Agarwal, P.C.; John E. Lynch, Esq.

(57) ABSTRACT

Method and apparatus for growing plants wherein rotating arrays of seeds or seedlings carried by arcuate ribs arranged around a common horizontal axis face a growth promoting light source; plant growth is promoted and weight distribution within each array is maintained when watering the rotating arrays. Several intermeshing arrays can make up a carousel wherein the arrays rotate together during plant growth, cropping and replanting.

15 Claims, 20 Drawing Sheets

U.S. PATENT DOCUMENTS

| | | | |
|---|---|---|---|
| 3,747,268 | A | 7/1973 | Linder |
| 3,909,978 | A | 10/1975 | Fleming |
| 3,973,353 | A | 8/1976 | Dedolph |
| 4,085,544 | A | 4/1978 | Blake |
| 4,255,897 | A | 3/1981 | Ruthner |
| 4,356,664 | A | 11/1982 | Ruthner |
| 5,157,869 | A | 10/1992 | Minton |
| 5,165,364 | A | 11/1992 | Horkey |
| 5,372,474 | A | 12/1994 | Miller |
| 5,515,648 | A | 5/1996 | Sparkes |
| 5,584,141 | A | 12/1996 | Johnson |
| 5,617,673 | A | 4/1997 | Takashima |
| 5,862,628 | A | 1/1999 | Takashima |
| 6,378,246 | B1 | 4/2002 | DeFoor |
| 6,394,030 | B1 | 5/2002 | Geiger et al. |
| 6,557,491 | B1 | 5/2003 | Weiser et al. |
| 6,604,321 | B2 | 8/2003 | Marchildon |
| 6,766,817 | B2 | 7/2004 | da Silva |
| 6,837,002 | B2 | 1/2005 | Costa |
| 6,840,007 | B2 | 1/2005 | Leduc et al. |
| 6,918,404 | B2 | 7/2005 | Dias da Silva |
| 6,928,772 | B2 | 8/2005 | Bai et al. |
| 6,951,076 | B2 | 10/2005 | Winsbury |
| 6,983,562 | B2 | 1/2006 | Sanderson |
| 7,066,586 | B2 | 6/2006 | da Silva |
| 7,143,544 | B2 | 12/2006 | Roy |
| 7,168,206 | B2 | 1/2007 | Agius |
| 7,181,886 | B2 | 2/2007 | Bourgoin et al. |
| 7,188,451 | B2 | 3/2007 | Marchildon |
| 7,285,255 | B2 | 10/2007 | Kadlec et al. |
| 7,401,437 | B2 | 7/2008 | Dumont |
| 7,488,098 | B2 | 2/2009 | Dumont |
| 2002/0144461 | A1 | 10/2002 | Marchildon |
| 2004/0111965 | A1 | 6/2004 | Agius |
| 2004/0163308 | A1 | 8/2004 | Uchiyama |
| 2005/0011119 | A1 | 1/2005 | Bourgoin et al. |
| 2005/0039396 | A1 | 2/2005 | Marchildon |
| 2005/0039397 | A1 | 2/2005 | Roy |
| 2005/0055878 | A1 | 3/2005 | Dumont |
| 2005/0257424 | A1 | 11/2005 | Bissonnette et al. |
| 2006/0150481 | A1 | 7/2006 | Hung et al. |
| 2006/0230674 | A1 | 10/2006 | Marchildon |
| 2006/0272210 | A1 | 12/2006 | Bissonnette et al. |
| 2007/0141912 | A1 | 6/2007 | Dumont |
| 2007/0212281 | A1 | 9/2007 | Kadlec et al. |
| 2007/0271842 | A1 | 11/2007 | Bissonnette et al. |
| 2008/0015531 | A1 | 1/2008 | Hird et al. |
| 2008/0222949 | A1 | 9/2008 | Bissonnette et al. |

FOREIGN PATENT DOCUMENTS

| | | | |
|---|---|---|---|
| CA | 2396317 | A1 | 8/2002 |
| CA | 2412073 | A1 | 5/2004 |
| CA | 2503705 | C | 6/2004 |
| CA | 2431523 | A1 | 9/2004 |
| CA | 2536116 | A1 | 2/2005 |
| FR | 2240684 | | 3/1975 |
| FR | 2345912 | | 10/1977 |
| FR | 2680074 | A1 | 2/1993 |
| GB | 2269304 | A | 2/1994 |
| JP | 4229111 | A | 8/1992 |
| JP | 2001128571 | A | 5/2001 |
| RU | 2034448 | C | 5/1995 |
| SU | 420288 | | 3/1974 |
| SU | 650557 | | 3/1979 |
| SU | 914004 | B | 3/1982 |
| SU | 1722301 | A1 | 3/1992 |

OTHER PUBLICATIONS

PCT International Search Report and the Written Opinion in International App. No. PCT/US08/06416, dated Sep. 29, 2008 (9 pp.).

Derwent Abstract Accession No. 93-065376/08, SU 1722301 A1 (Bozhok) Mar. 30, 1992 (2 pp.).

International Preliminary Examination Report for PCT/AU02/00097, dated Apr. 30, 2002 (6 pp.).

PCT International Search Report for International App. No. PCT/AU02/00097, dated Mar. 1, 2002 (2 pp.).

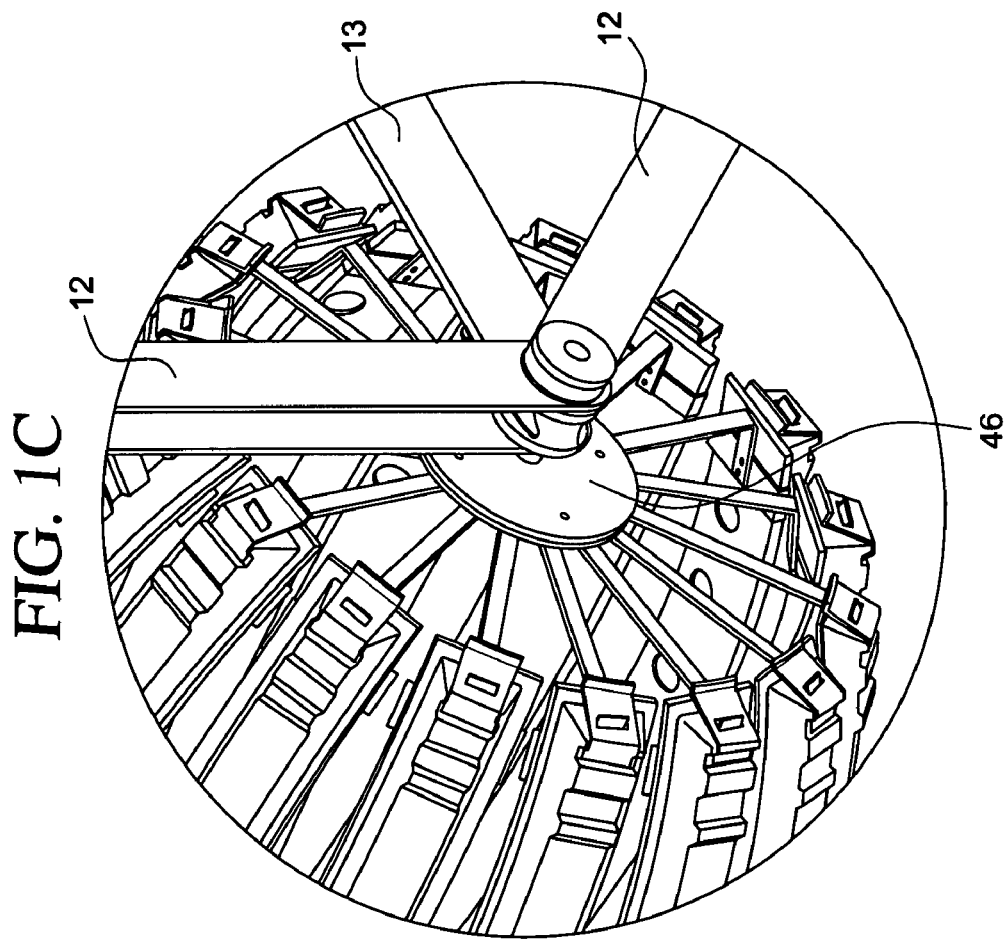
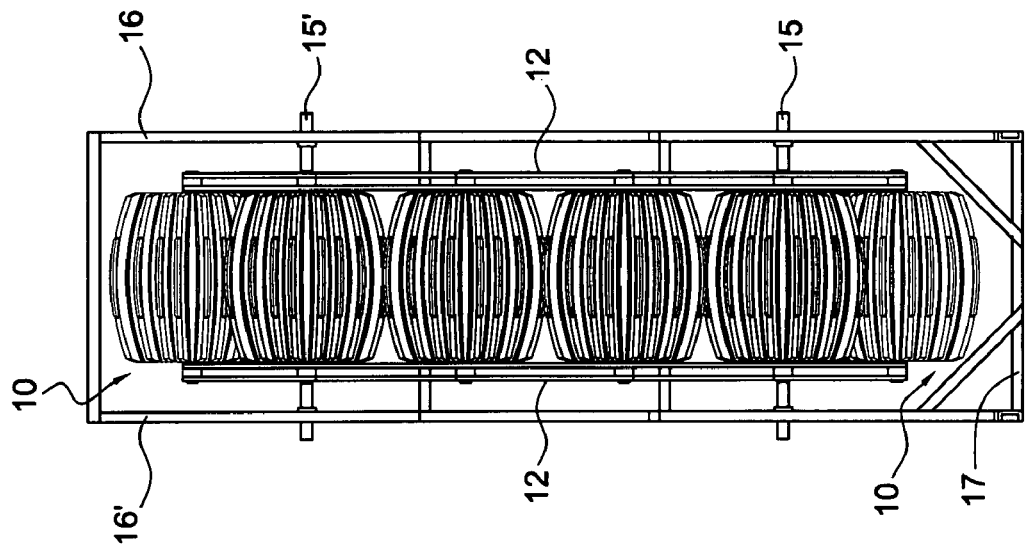

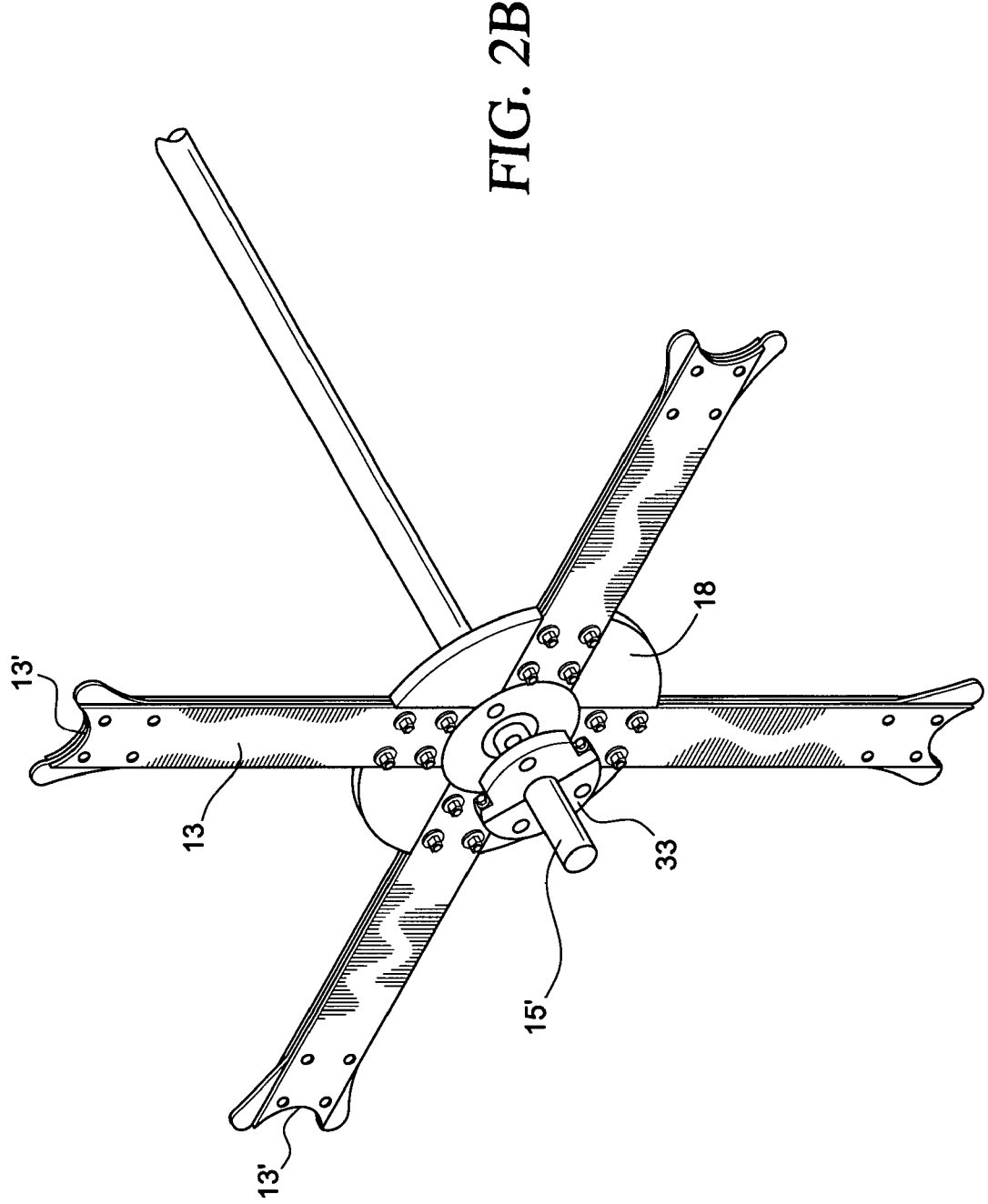

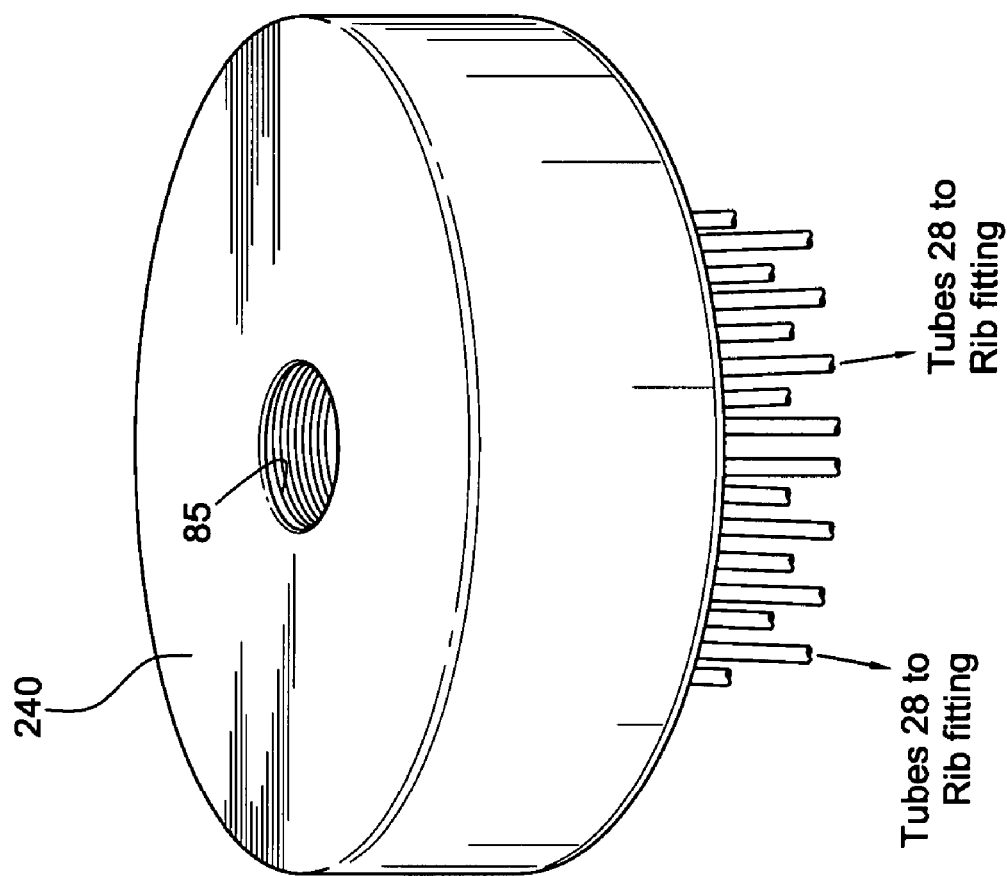

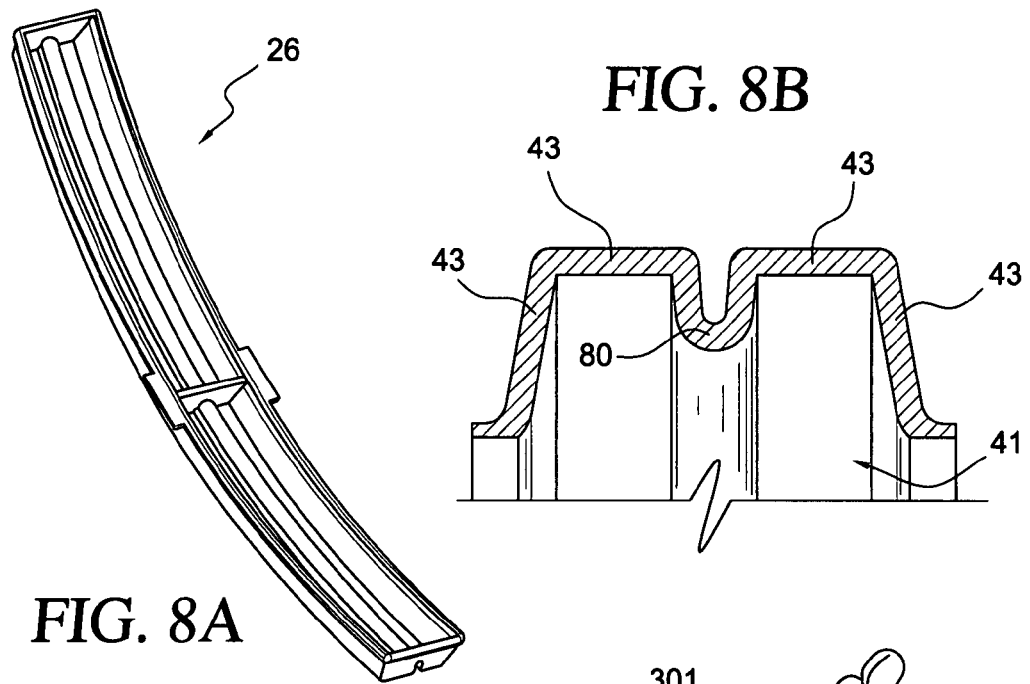
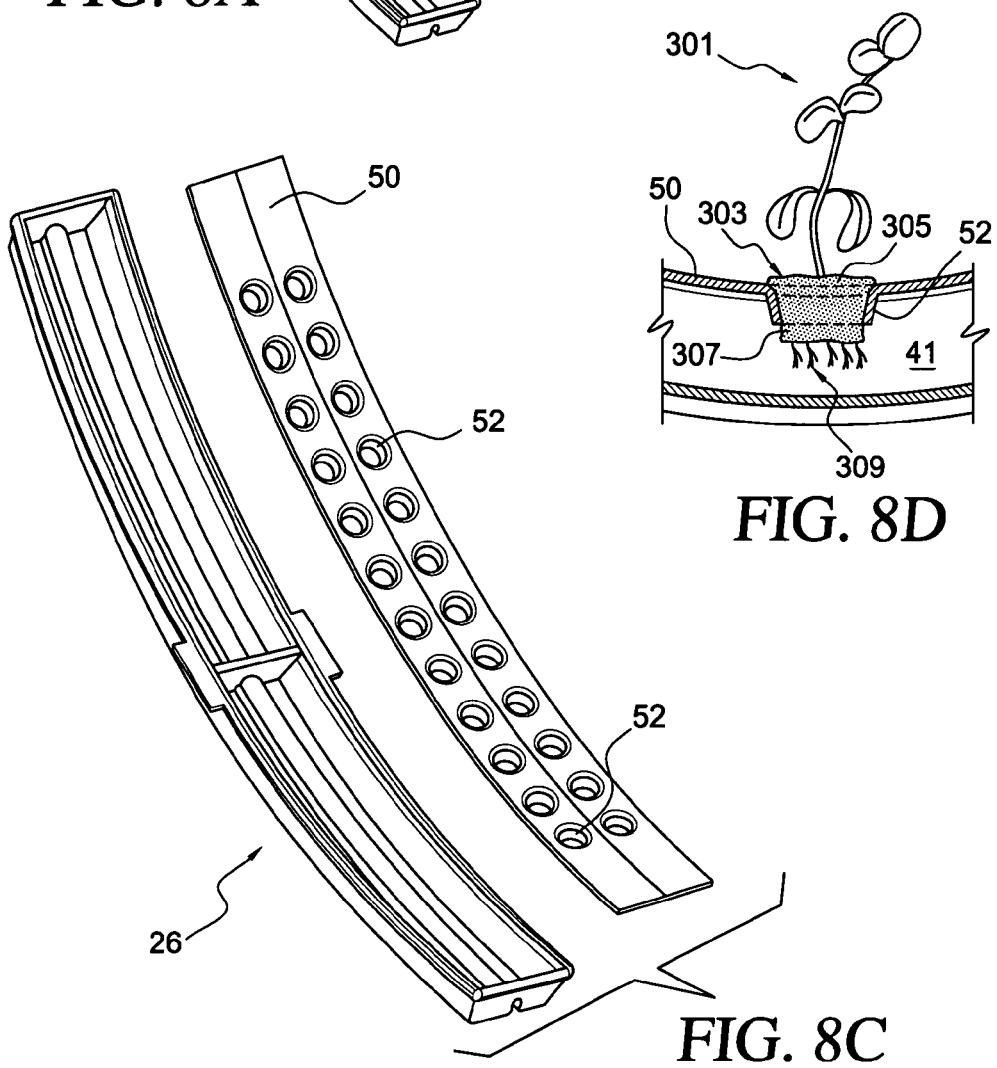

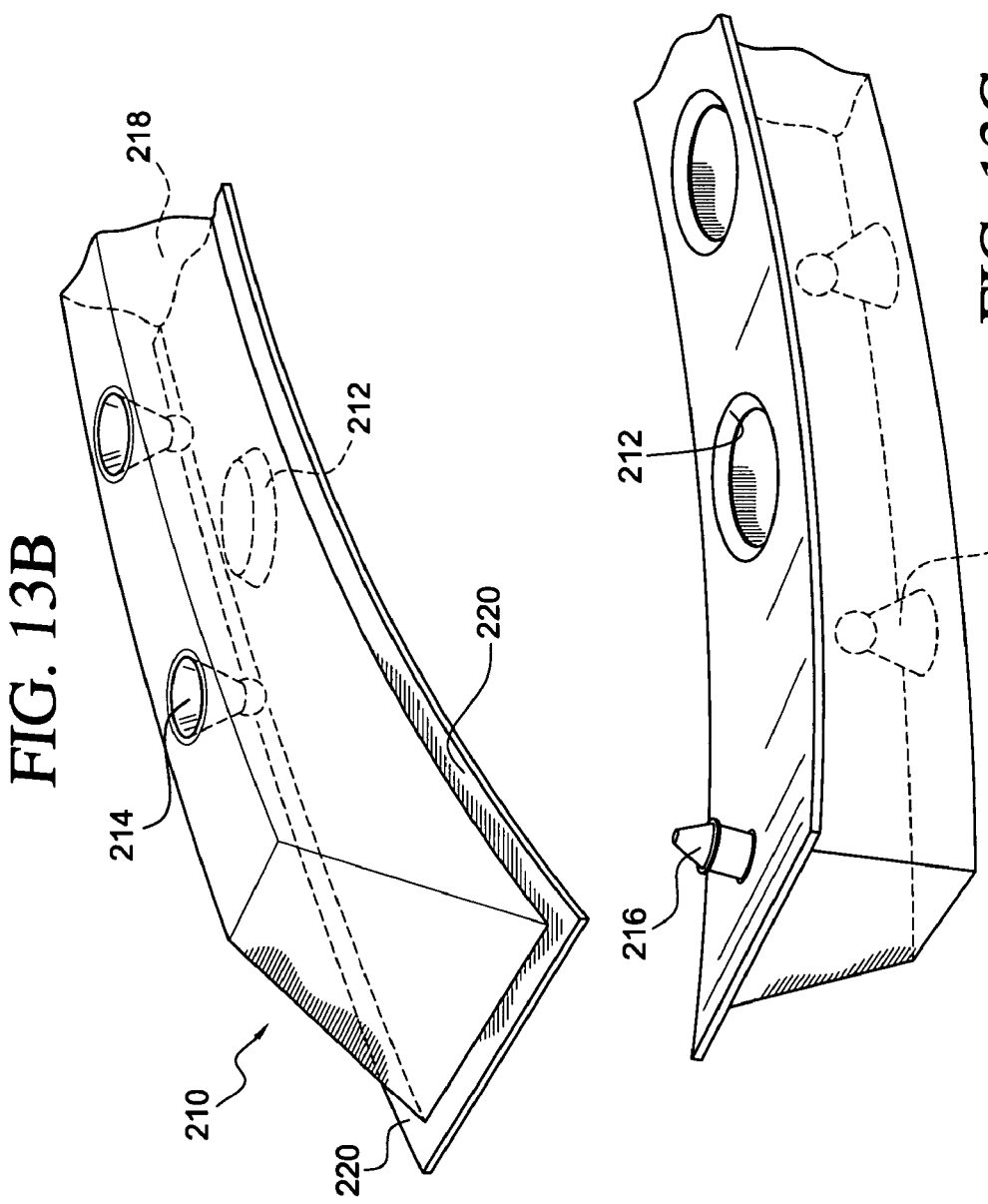
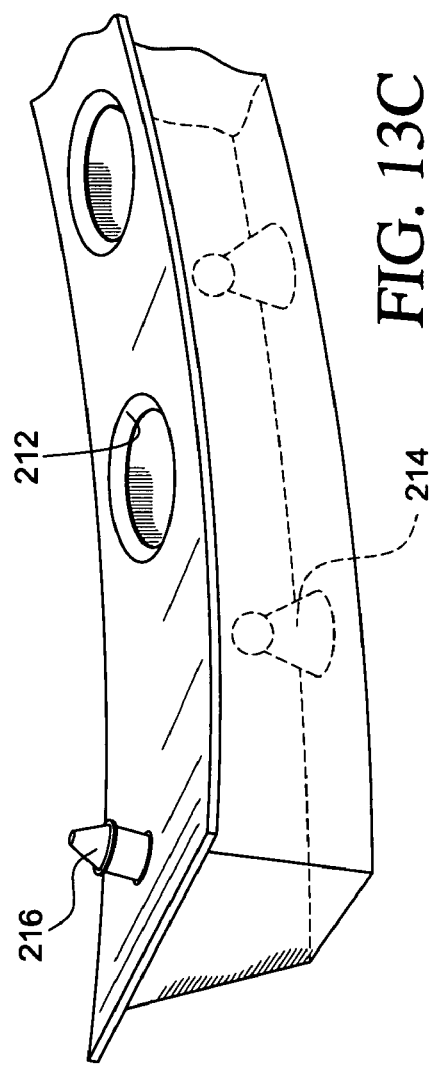
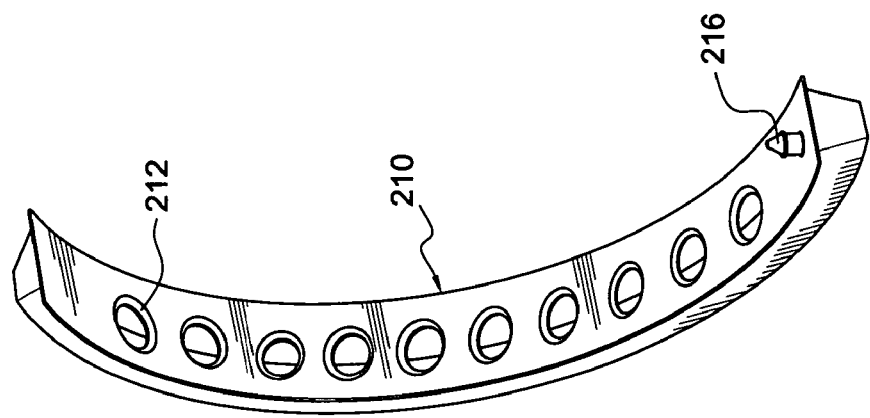

METHOD AND APPARATUS FOR GROWING PLANTS IN CAROUSELS

CROSS-REFERENCE TO RELATED APPLICATIONS

This is a continuation-in-part of application Ser. No. 11/791,851, filed May 30, 2007, which is a continuation-in-part of application Ser. No. 11/073,562, filed Mar. 8, 2005 now U.S. Pat. No. 7,415,796, both are hereby incorporated herein in their entirety by reference.

FIELD OF THE INVENTION

This invention relates to method and apparatus for growing plants in a controlled setting using and precisely controlling combinations of light, water, nutrition, gravity, centrifugal forces and temperature to produce ideal growing conditions resulting in maximum possible plant growth and crop production.

SUMMARY OF THE INVENTION

The invention provides a highly efficient system that can grow a variety of commercially desirable crops in simple, compact, automated facilities. The volume of crops that can be grown in a given space is increased by a factor of four in a preferred embodiment compared to traditional methods. The invention creates a highly controlled environment that is suitable for significantly enhancing plant growth in places where it was previously not feasible because of economic or environmental constraints. Environmentally, the invention uses significantly less water than traditional methods and avoids problems associated with the disposal of nutrient solutions and growth media. The invention can be used to grow a variety of crops, including leafy vegetables, green vegetables, herbs, medicinal plants, transgenic plants, fruits and berries.

The invention provides rotating arrays of plants growing towards to a light source at the center of each array. A precision nutrient supply system promotes rapid and efficient plant growth. Vertical carousels hold multiple rotating arrays while providing interconnection with the nutrient supply system. Carousels are set up side-by-side in banks with an adjacent conveyor belt for planting and harvesting.

In operation, arrays are populated with seeds or seedlings and managed through a prescribed grow-out regime that includes nutrient application, inspection and testing, quality control and, when needed, intermediate treatments (thinning, culling, pollination, pest control). Mature crops are harvested, and post-harvest maintenance, such as cleaning, prepares the arrays for another production cycle.

The method for growing plants according to the invention includes the following steps:

(a) providing intermeshing plant arrays each including a plurality of hollow arcuate ribs arranged around a common horizontal axis which carry seeds or seedlings in growth media facing the axis and are spaced apart so as to intermesh with the ribs of contiguous arrays for common rotation;

(b) providing a growth promoting light source generally at the center of each array which is operable during periods of plant growth and non-growth;

(c) rotating one of the arrays around its horizontal axis thereby causing intermeshing arrays to rotate together at the same speed; and (d) watering all the plants in an array at the same time to maintain even weight distribution within each array for smooth, balanced rotation.

Preferred embodiments include: (i) watering the plants in an array by simultaneously injecting water into the interior of the ribs; (ii) a plant holding member on the face of each rib having plant site apertures to hold plants in growth media which is exposed to the interior of said ribs; and (iii) ribs containing particulate material which contacts growing plants and receives water for watering the plants.

In another preferred embodiment, plant arrays are arranged in a vertical carousel within which the arrays travel from a drive position in which one array is rotated to a loading/unloading position in which array is not rotated.

Apparatus for growing plants according to the invention includes:

(a) intermeshing plant arrays each including a plurality of hollow arcuate ribs arranged around a common horizontal axis which carrying seeds or seedlings in growth media facing the axis and are spaced apart so as to intermesh with the ribs of contiguous arrays for common rotation;

(b) a growth promoting light source generally at the center of each array which is operable during periods of plant growth and non-growth;

(c) means to rotate one of the arrays thereby causing intermeshing arrays to rotate together at the same speed; and (d) means to water all the plants in an array at the same time to maintain even weight distribution within each array for smooth, balanced rotation.

Preferred embodiments include: (i) means to simultaneously inject water into the interior of the ribs; (ii) a plant holding member on the face of the ribs with plant site apertures for holding plants in growth media exposed to the interior of the ribs; and (iii) ribs containing particulate material which contacts growing plants and receives water for watering the plants.

In another preferred embodiment, intermeshing plant arrays are arranged in a vertical carousel and includes means to move the arrays therein from a drive position in which one array is rotated to a loading/unloading position in which one array is not rotated.

BRIEF DESCRIPTION OF THE DRAWINGS

The following drawings show preferred embodiments and are not intended to restrict or otherwise limit the invention in any way. All known functional equivalents of components or elements disclosed or shown herein are within the intent and scope of the invention.

FIG. 1B is an end view of the carousel shown in FIG. 1A;

FIG. 1C is an enlarged, partial section showing a segment of a plant array and the carousel of FIG. 1A;

FIG. 2B is a perspective view of a segment of the carousel shown in FIGS. 1A and 2A;

FIG. 7C is a perspective view of the water manifold shown in FIG. 7B;

FIG. 8A is a perspective view of one embodiment of an arcuate rib shown without a plant holding member;

FIG. 8B is a cross-sectional view of the rib of FIG. 8A;

FIG. 8C is an exploded view of the rib of FIG. 8A shown with a plant holding member;

FIG. 8D is a cross sectional detail view showing a seedling plant in growth media inserted thru the plant holding member;

FIGS. 13 A-C are views, partly broken away in the case of FIGS. 13B and C, showing features of the arcuate ribs of FIG. 11;

DESCRIPTION OF PREFERRED EMBODIMENTS

Figure 1A:
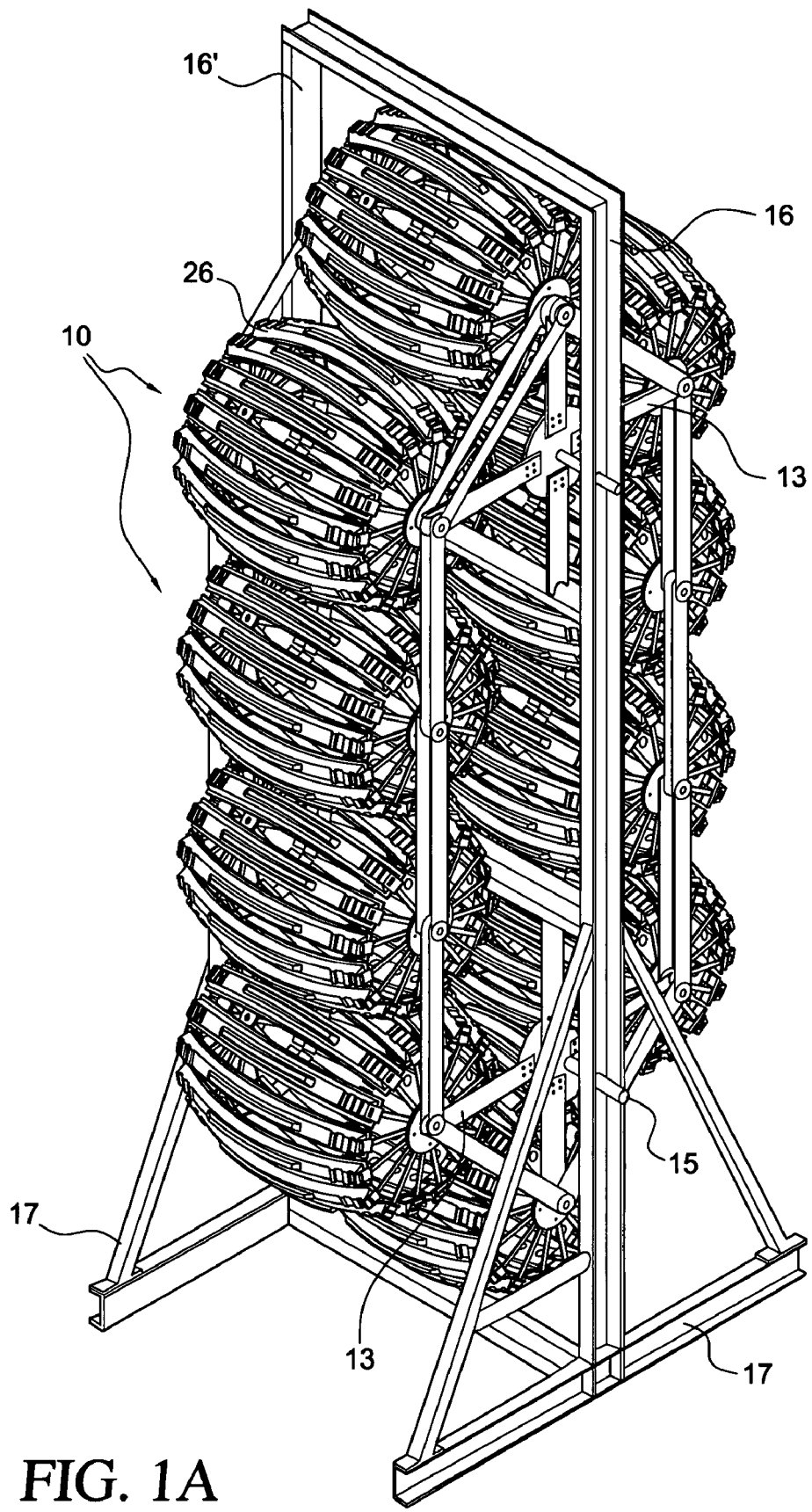
FIG. 1A is a perspective view showing a vertical carousel arrangement of horizontally rotatable plant arrays.
Figure 2A:
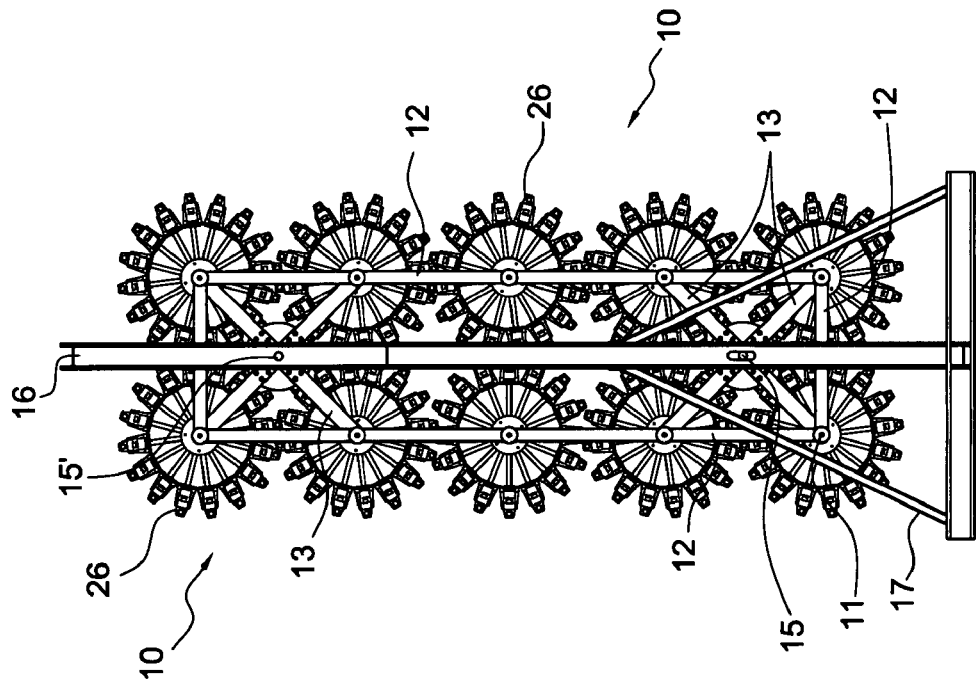
FIG. 2A is side view of the carousel of FIG. 1A showing the plant arrays in the drive position.

Referring now to the drawings, FIGS. 1A-C, 2A-C and 3 show a carousel containing ten plant arrays 10 each made of spaced apart arcuate ribs 26 which carry grown media and growing plants. The arrays 10 are mounted for tandem movement or circulation within a carousel by means of lower and upper shafts 15 and 15' carried by frame members 16 and 16' and base members 17, sprocket arms 13 and links 12 interconnecting and supporting arrays 10 in each carousel. Water input assemblies (FIGS. 7B and C) 11 are located on one side of a carousel and electrical input bearing assemblies are located on the other side of a carousel.

Sprocket arms 13 (FIG. 2B) are mounted on drive shafts 15 and 15' via hub 18 and notches 13' of each arm 13 engage bearings located between pairs of links 12 (FIG. 1C).

Figure 3:
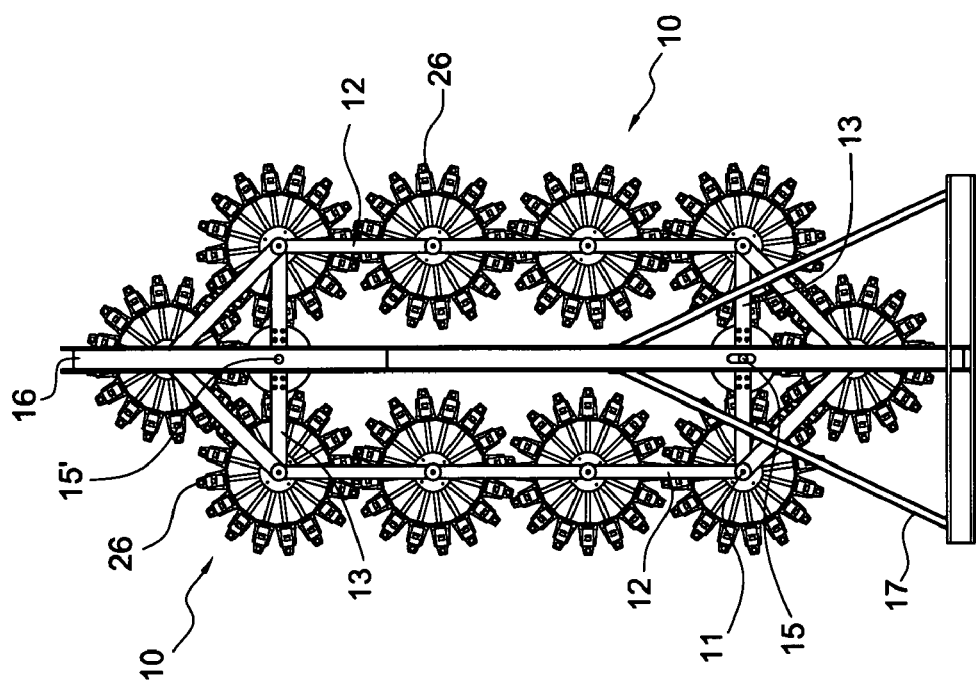
FIG. 3 is the same as FIG. 2A but showing the plant arrays in the carousel rotated to a loading/unloading position.

Shafts 15 or 15', which can be provided with couplers 33 to engage and disengage shafts 15 or 15', are rotated by a common clutch motor and gearbox 30, 32 (FIG. 2C) to circulate or move all the arrays 10 in a bank of carousels at once from a drive position (FIG. 2A) to an unloading/loading position (FIG. 3).

Figure 2C:
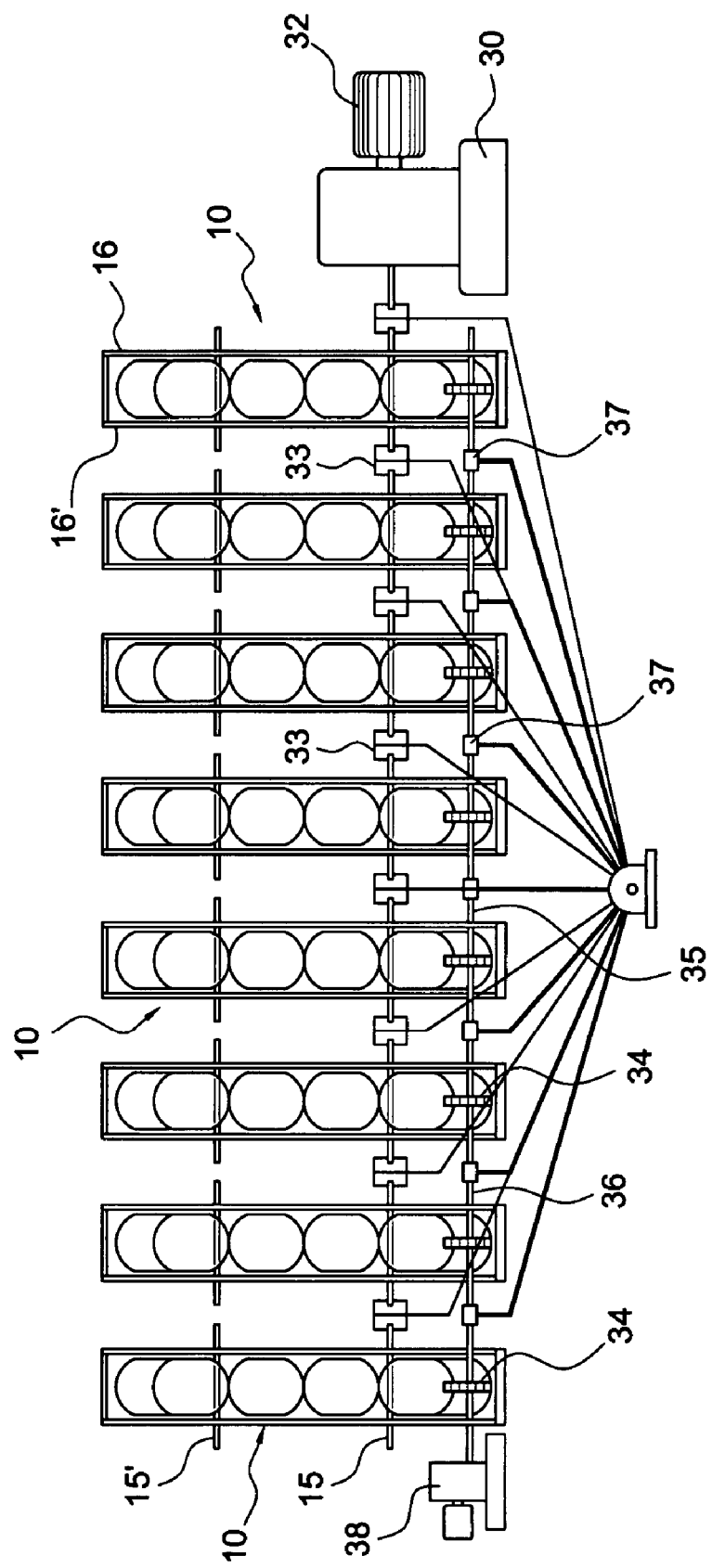
FIG. 2C is an end view showing a bank of the carousels shown in FIG. 1A.

To rotate one array which drives all of the intermeshing arrays 10 in a carousel at the same time and at the same rate of rotation, drive wheels 34 on shaft 35 (which can also be provided with engaging and disengaging couplers 37) engage the spaced apart ribs 26 of the lowermost array (FIG. 2C). Because all of the ribs 26 intermesh in a gear-like fashion between contiguous arrays 10, driving one array rotates all of the arrays in a given carousel. In both the drive and loading/unloading positions, ribs 26 of each array in a carousel intermesh causing the arrays to rotate together. In the unloading/loading position (FIG. 3), with drive wheel 34 disengaged, the arrays can easily be rotated together manually.

In some applications, the size of the arrays and/or the weight of ribs and plants may require that more than one array be driven to efficiently rotate all the arrays in a carousel.

Variable speed motor 38 turns shaft 35 and drive wheels 34 at the desired speed. Shaft 35 can be provided with a stop and start clutches or couplers 37 to disengage ribs 26 from wheels 34 to move the arrays from the drive position to the unloading/loading position.

Figure 4A:
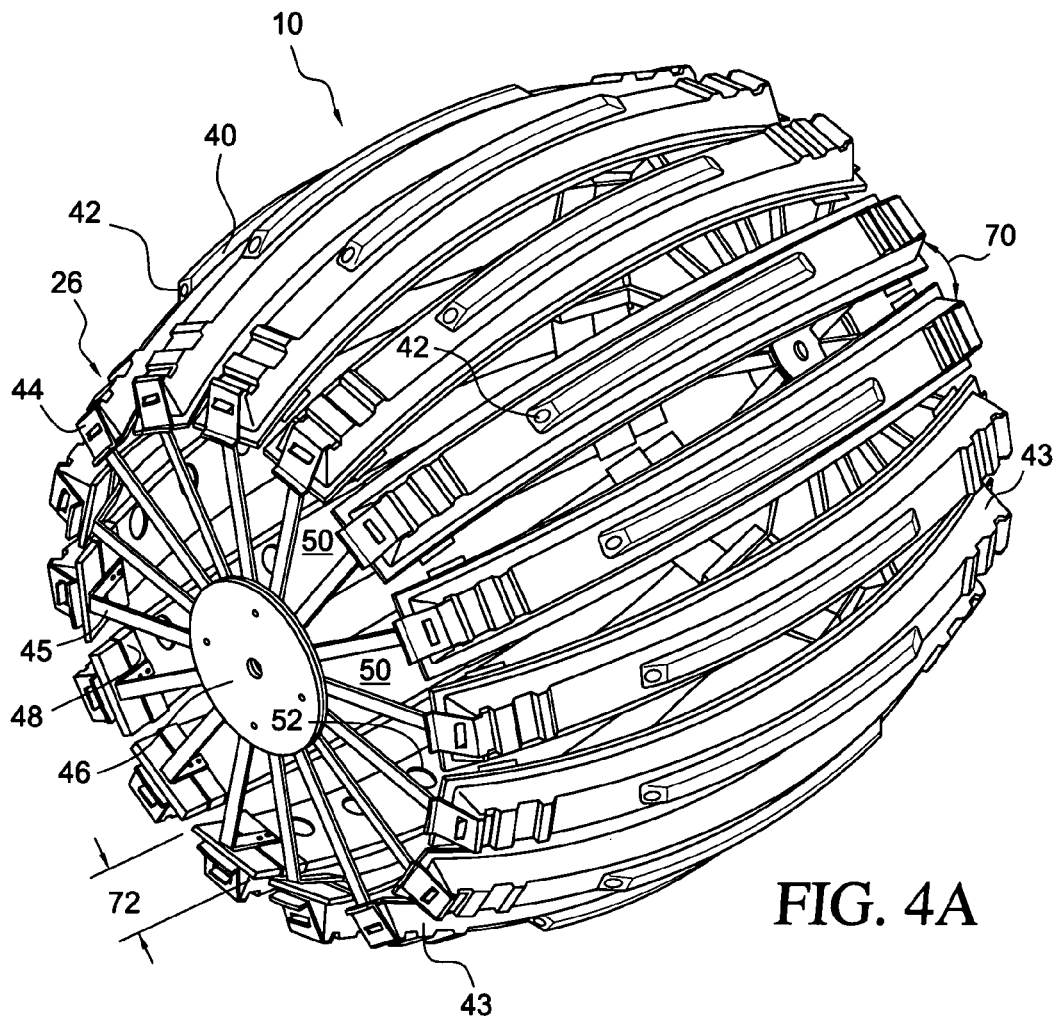
FIG. 4A is a perspective and partly broken away view of a plant array in FIG. 1A.
Figure 4B:
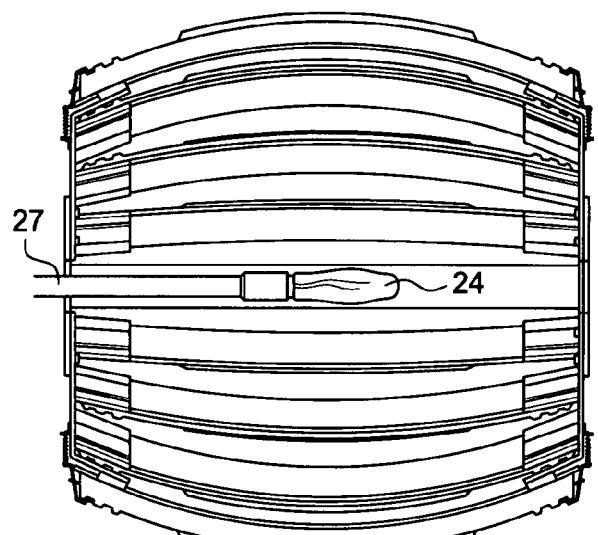
FIG. 4B is a partly broken away side view of the plant array of FIG. 4A.
Figure 5:
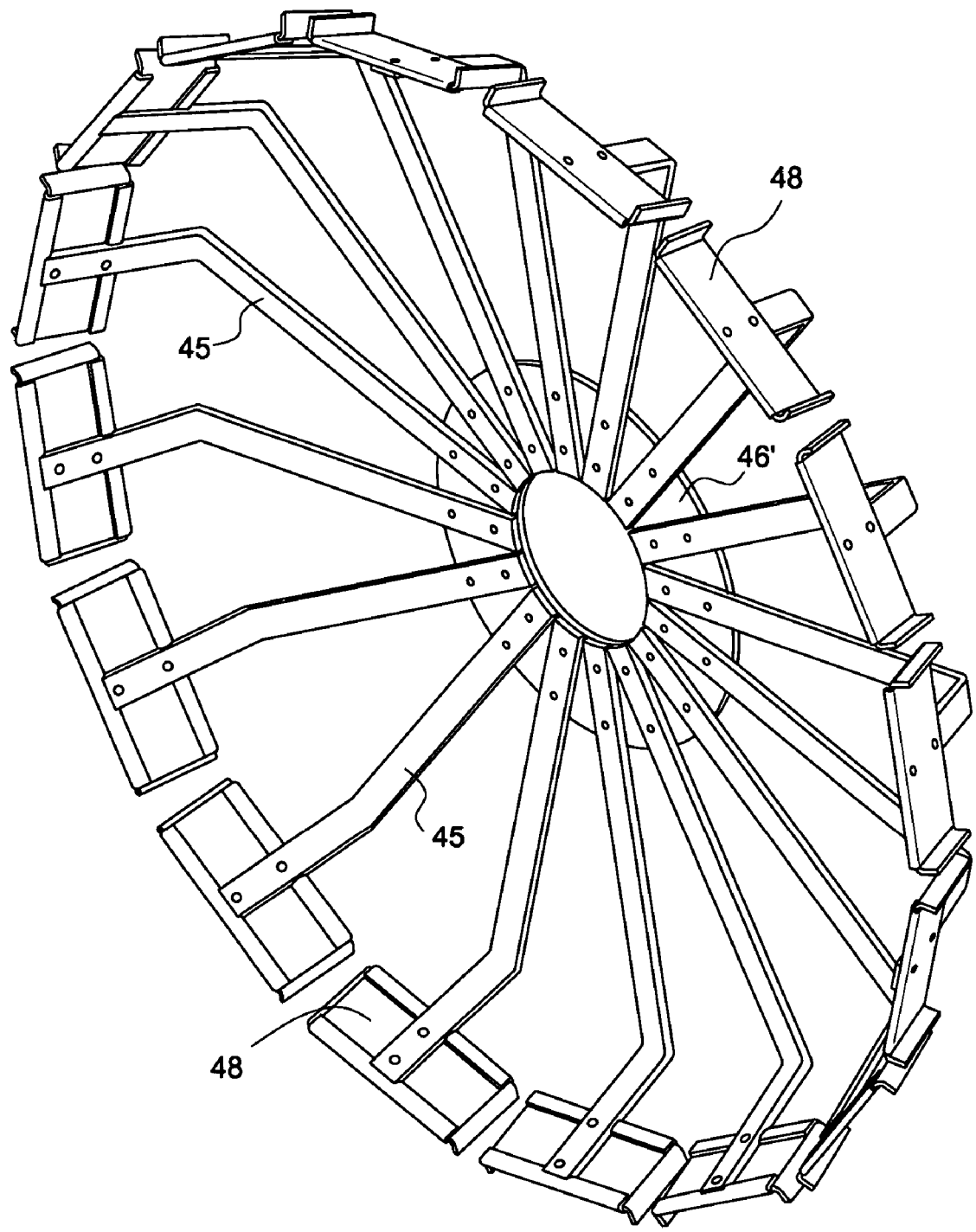
FIG. 5 is a perspective view of a portion of the plant array shown in FIG. 4A.

As shown in FIGS. 4A and B, 5 and 6, a preferred array comprises a plurality of arcuate ribs 26 arranged about a common horizontal axis. Each rib 26 has side and top walls 43 with a water distribution member 40 located centrally on the top or outside wall 43. Each rib 26 is closed by plant holding member 50 which contains spaced apart plant sites in the form of plant receiving apertures 52.

Figure 6:
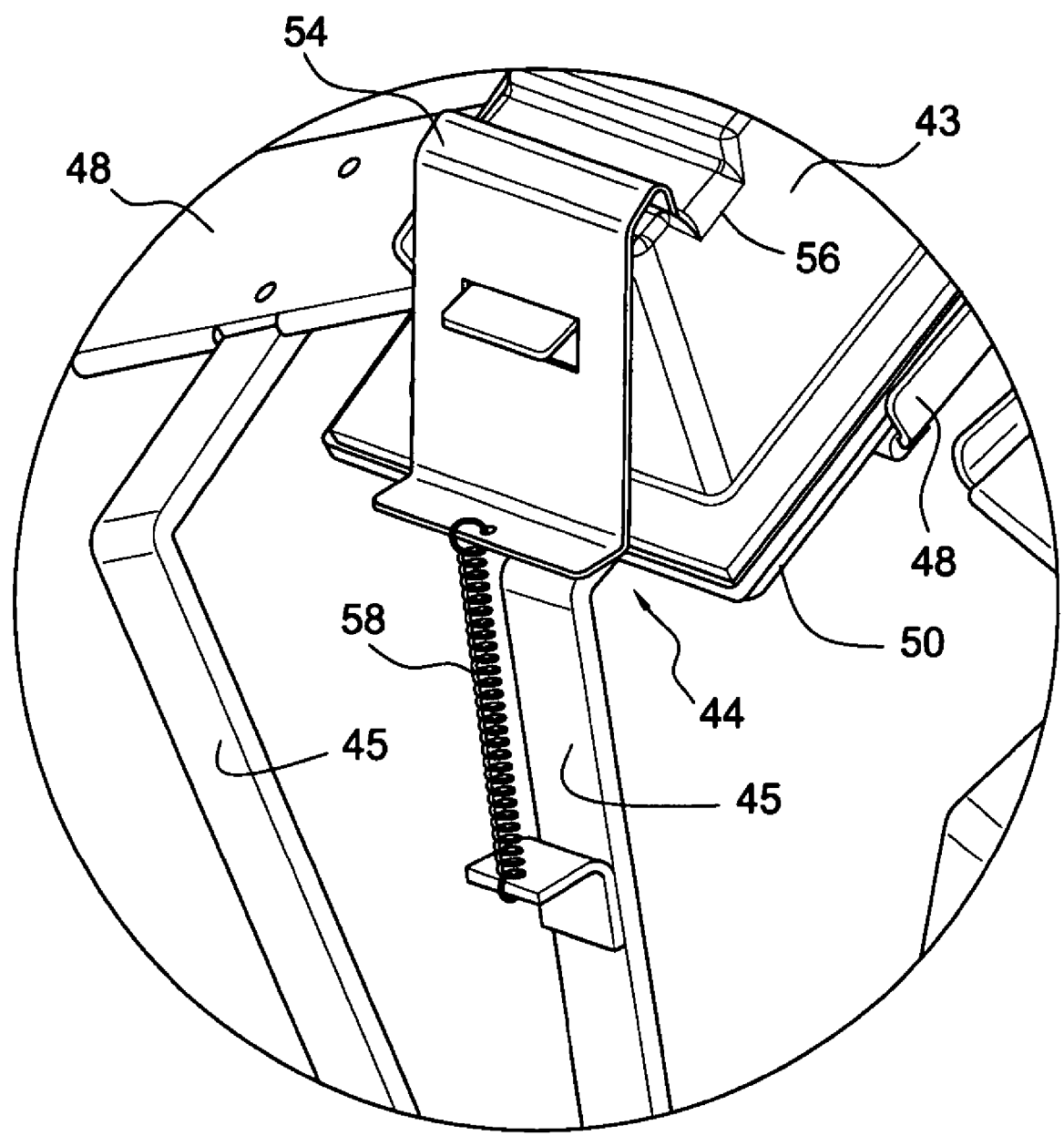
FIG. 6 is an enlarged view of a clip assembly shown in FIG. 4A.

Ribs 26 are mounted in a spaced apart manner as shown via hubs 46 and 46', spokes 45 interior clips 48 and end clips 44. Interior clips 48 engage the edges of member 50 which, in the embodiment shown, is wider than and extends beyond the edges of side walls 43. A preferred end clip 44 is spring loaded via spring 58 on a spoke 45 and has a hook-like end portion 54 which engages a corresponding slot 56 near the end of each rib 26 (FIG. 6). Each rib in a given array can easily be removed for cropping and replanting when a carousel is in the loading/unloading position (FIG. 3) by removing end clips 44 and lifting the rib from the array. For efficiency, freshly planted ribs can replace ribs with fully grown plants which are removed for cropping and replanting.

Each rib 26 is spaced from adjacent ribs by an approximate distance 70 which is approximately the same or slightly greater than the width 72 of member 50 of each individual rib 26 (FIG. 4A).

Figure 7A:
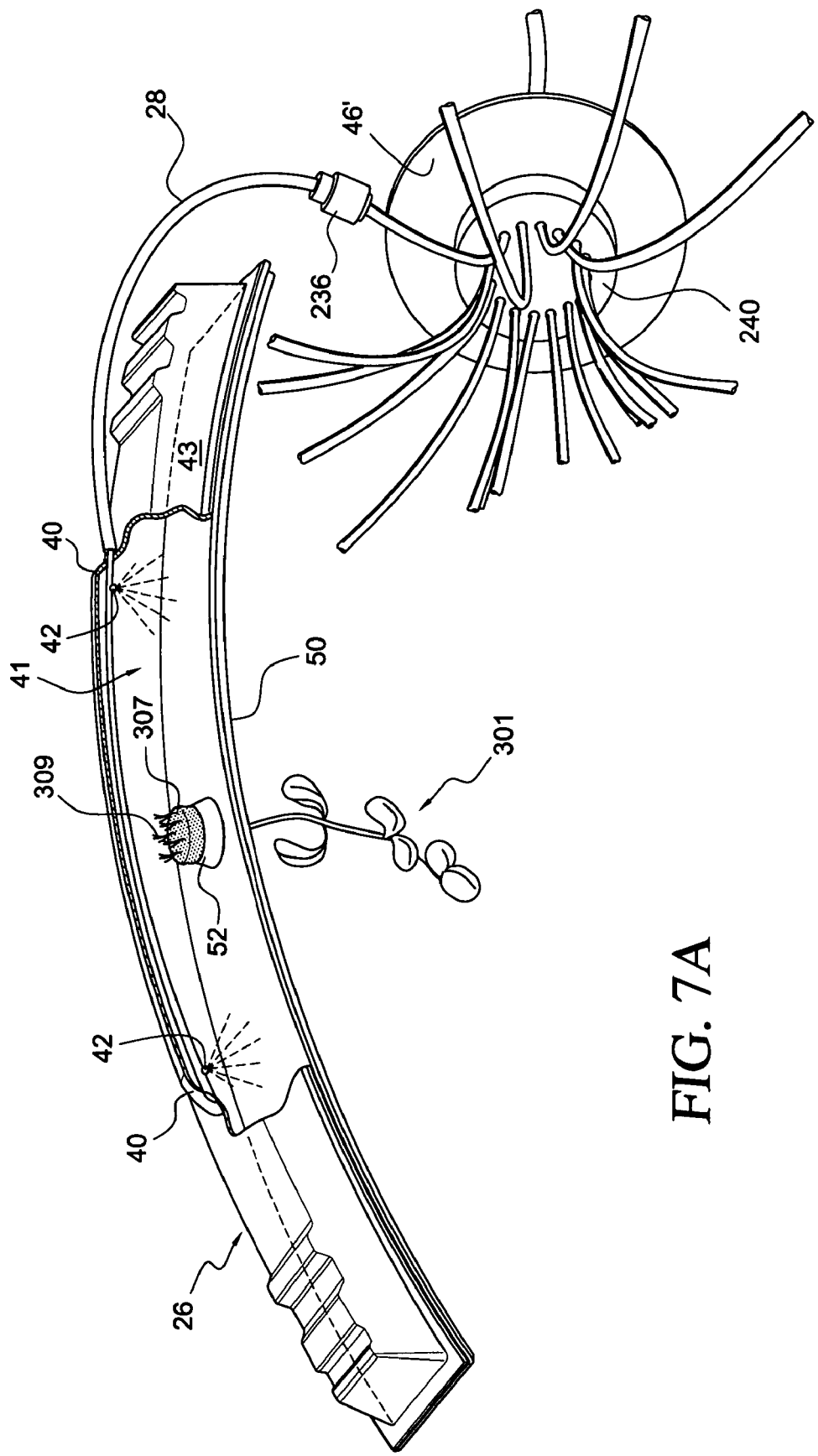
FIG. 7A is a side perspective view, partly broken away, of an arcuate rib shown in FIG. 4A with water connections for spraying water into the interior of a rib and also showing a plant seedling in growth media inserted thru an aperture in a plant holding member.

As shown in FIGS. 4A and 7A, each rib 26 includes an open trough member 43 with top, side and end walls and a plant holding member 50 which covers trough 43 creating rib interior 41. Water distribution member 40 sits on the exterior of the top of member 43. Member 50 can have one, two or more rows of plant receiving apertures 52 (see also FIGS. 8A-D) which preferably have an inwardly tapering, conical shape with an open bottom. A slightly oversized and compacted peat puck 303 containing seed or a seedling 301 is forced into opening 52 such that root side 307 of the puck expands as it extends into rib interior 41 beyond the end of tapered opening 52. Plant side 305 of puck 303 remains firmly wedged in opening 52 even with or above the outer surface of member 50. As plant 301 grows, roots 309 develop and extend from puck section 307 into space 41.

Interior 41 of ribs 26 can remain hollow for hydroponic plant growth or it can be filled with particulate material such a peat, ground cocoa shells, diatomaceous earth, mica and like materials for organic plant growth. The material is preferably light like peat or cocoa shell. This material contacts puck potion 307 and roots 309 to facilitate water and nutrients getting to the plants.

Each rib has a water distribution member 41 and a pair (or more) of injection nozzles 42 for injecting water and nutrients into the interior of each rib. To maintain even weight distribution, water is delivered to all the ribs in an array at the same time via manifold 240 mounted to hub 46' (FIG. 7A). Line 28 has quick connecting water fittings 236 (to facilitate rib exchange during cropping) and delivers water to spray nozzles 42. Water is distributed evenly within each rib by the wicking action of particulate material in a rib which contacts roots 309 and puck portion 307 and/or by rotation of the array. Ribs 26 are arcuate or curved in shape, in contrast to straight or flat, to facilitate water distribution as an array rotates about its horizontal axis. Wireless sensors (not shown) can be inserted into one or more rib interiors in an array to measure and regulate water and nutrient levels.

Figure 11:
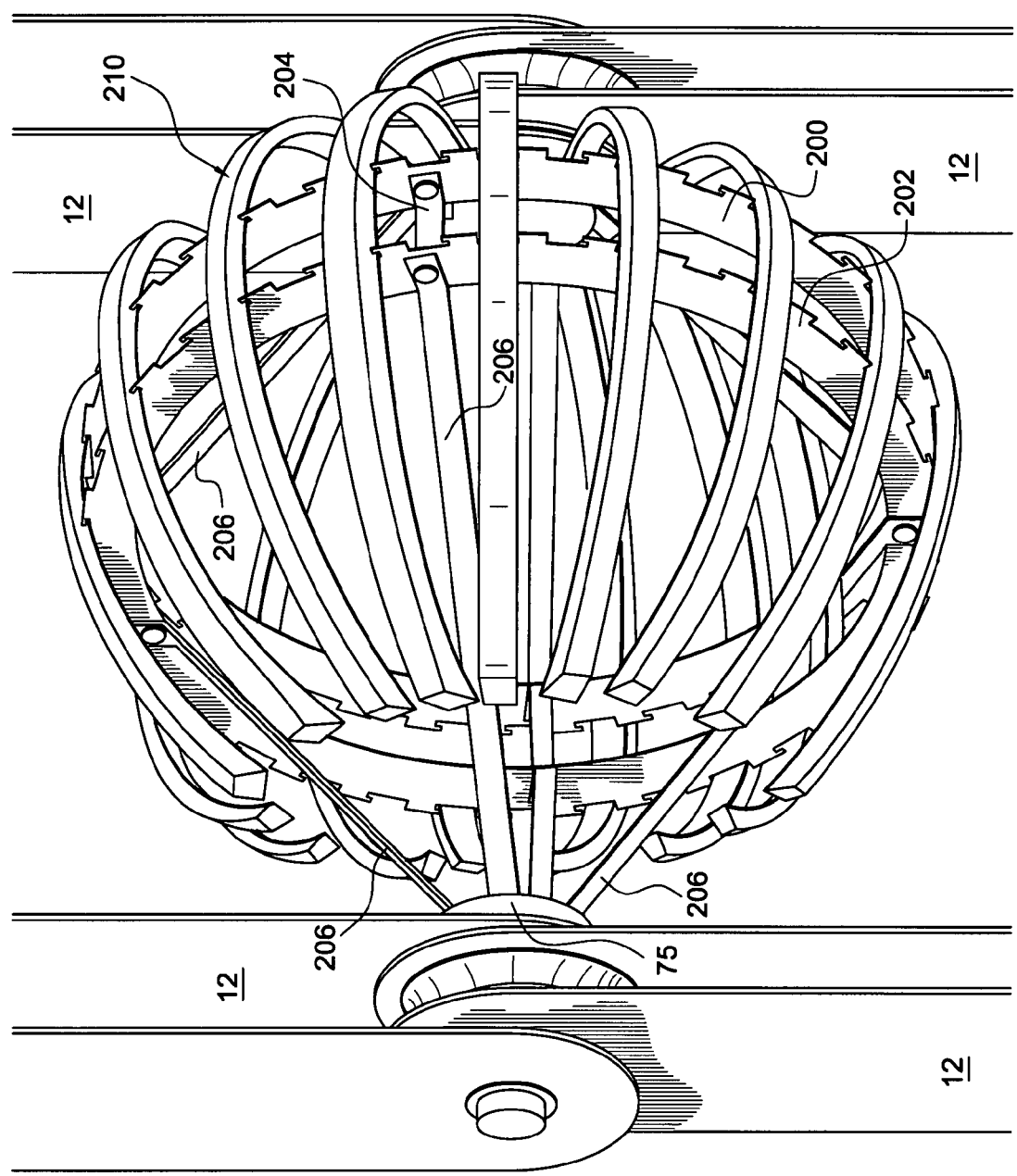
FIG. 11 is a perspective view of an alternate embodiment employing an open framework with arcuate plant-carrying ribs mounted thereon.

The array shown in FIG. 4A, for example, has an overall barrel-like configuration while the array of FIG. 11 is more circular like. Any symmetrical configuration embodying curved ribs can be employed to present an oval, elliptical, barrel-like, circular or like shape for an array.

Figure 7B:
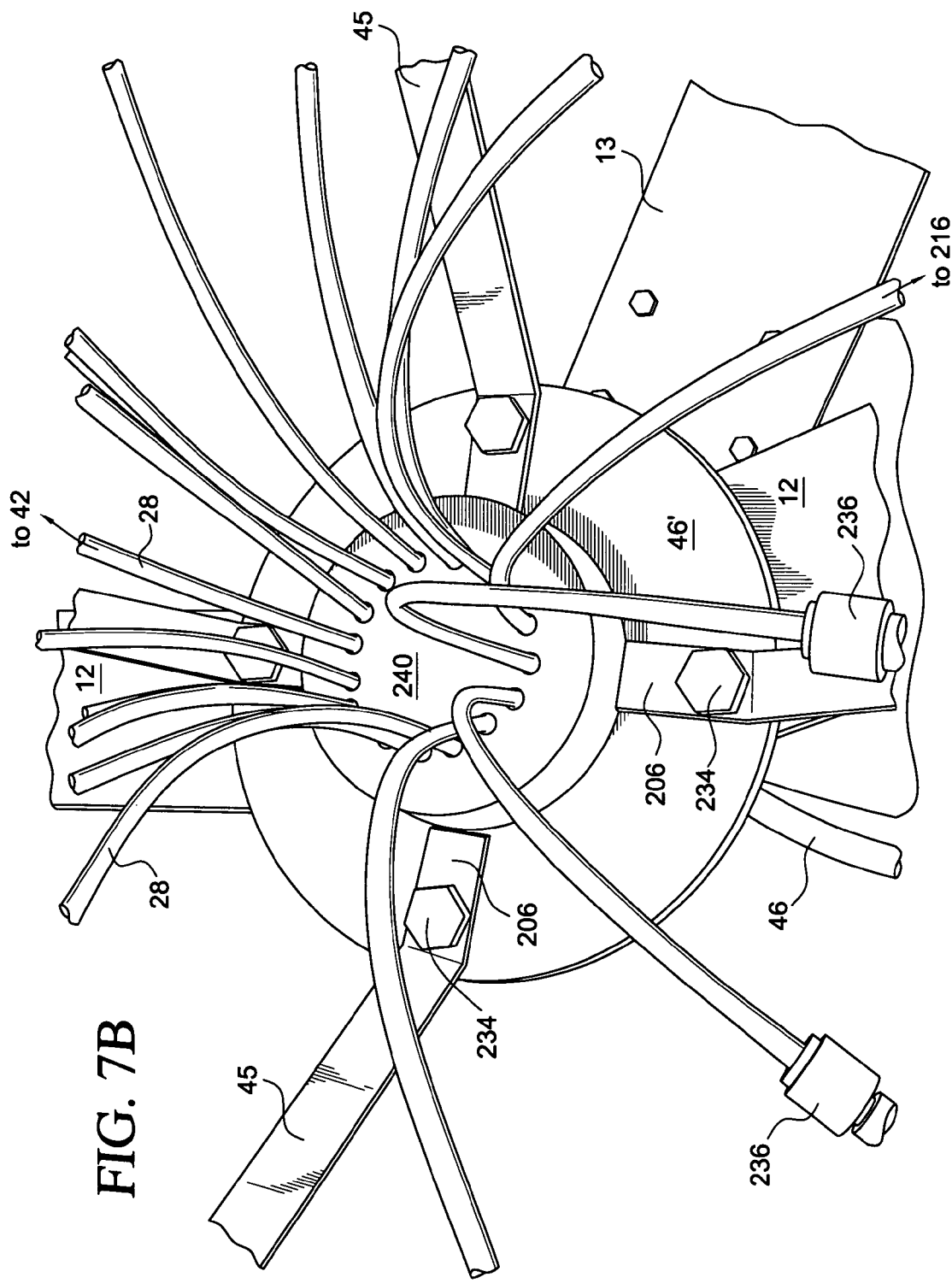
FIG. 7B is a side view showing a rotating water manifold for delivering water to arcuate ribs in a plant array.

FIGS. 7B and C show manifold 240 with threaded apertures extending through mounting flange 46' on which spokes 45 are mounted via bolts 234. Water (and selected nutrients when desired or needed) is fed from hose 46 into the interior of manifold 240 and exits to tubes 28 which feeds nozzles 42 on each rib.

When growing strawberries, for example, each hour during plant growth, a five or so second blast of water is fed simultaneously to spray heads 42 in all the ribs in a given array. Peat or ground cocoa in each rib and array rotation (e.g., one rotation per hour) distribute the water evenly to maintain good balance for smooth, stress free rotation.

An alternate rib structure is shown in FIGS. 8A-C to comprise trough 43 divided via interior rib 80 into two channels over which lies member 50 with two rows of puck/plant receiving apertures 52 (see FIG. 8D).

FIGS. 11-14 show an alternate embodiment using open framework arrays made of a pair of circular bands 200, 202, spacing bars 204 and lateral braces 206 which are attached to a rotating flange 75 FIGS. (4B and 21). Four or eight arcuate ribs 210 are carried in each quarter of the array by bands 200 and 202 via mounting slots 201 and 203 which receive lateral edges 220 of ribs 210 (FIG. 13B) and holding members 205.

Ribs 210 have hollow interiors 218 and are configured to lie along curved lines as shown. Each rib 210 is provided with a water fitting 216 (such as an Ericson compression fitting well know in the art) which connects with a tube 28 to deliver water and plant nutrients to each rib interior 218. Conical members 214 extend into the rib interiors 218 from the exterior or concave side of the ribs to assist in water distribution which takes place as the ribs in a array rotates about its horizontal axis.

Conical members 214 may also have apertures at their tip (not shown) to aid in gas exchange during plant growth. Air exchange also takes place thru growth plant puck 303. The water level in the interior of ribs 210 preferably should not exceed the height of the conical members 214 to prevent leaking when they are provided with tip apertures. As ribs 210 rotate without containing particulate material, water fed to their interiors will tumble and slosh around and generally constantly contact growth media puck 303 extending into each rib during the entire rotation cycle. Thus, water will collect at the center of the ribs when they are at the six o'clock position and will then tumble and become distributed, with the aid of conical members 214, as the ribs rotate to the twelve o'clock position where the water will collect at the ends of the ribs. Distribution is then reversed as the ribs return to the six o'clock position. This movement of the water in the ribs also acts as a water piston aiding gas exchange thru growth media 303 and the tip apertures of members 214. It is preferred to charge the ribs with water at intervals and allow the growing plants to consume the water during portions of the growth cycle, for example for about an hour in the case of basil, and then recharging, preferably before the plants go dry.

Rotation of the arrays in FIG. 11 and movement from the drive and loading/unloading positions in a carousel is carried out in the same manner as described for FIGS. 1-3.

Figure 12:
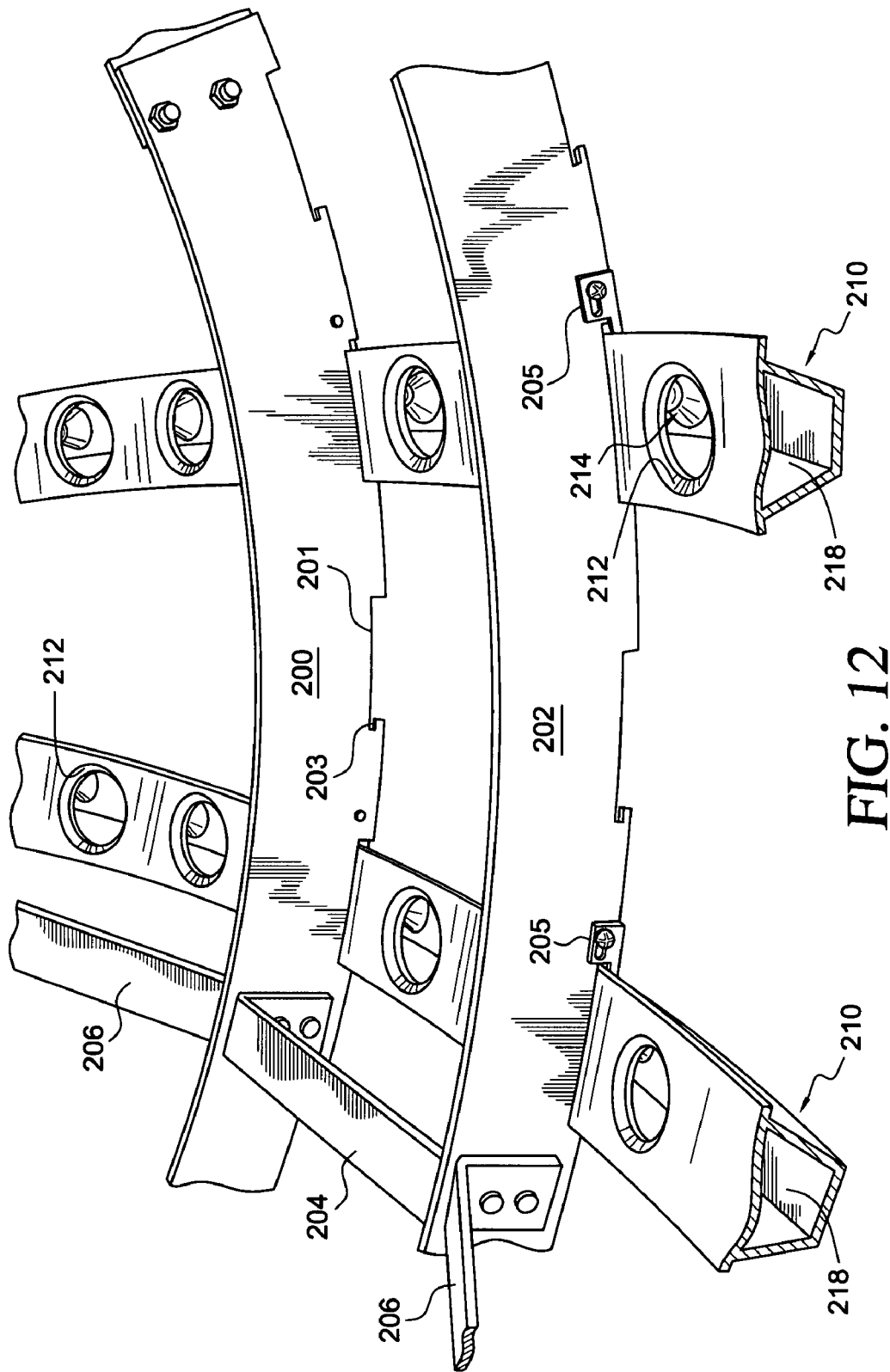
FIG. 12 is a detailed partial view of the array shown in FIG. 11.
Figure 14:
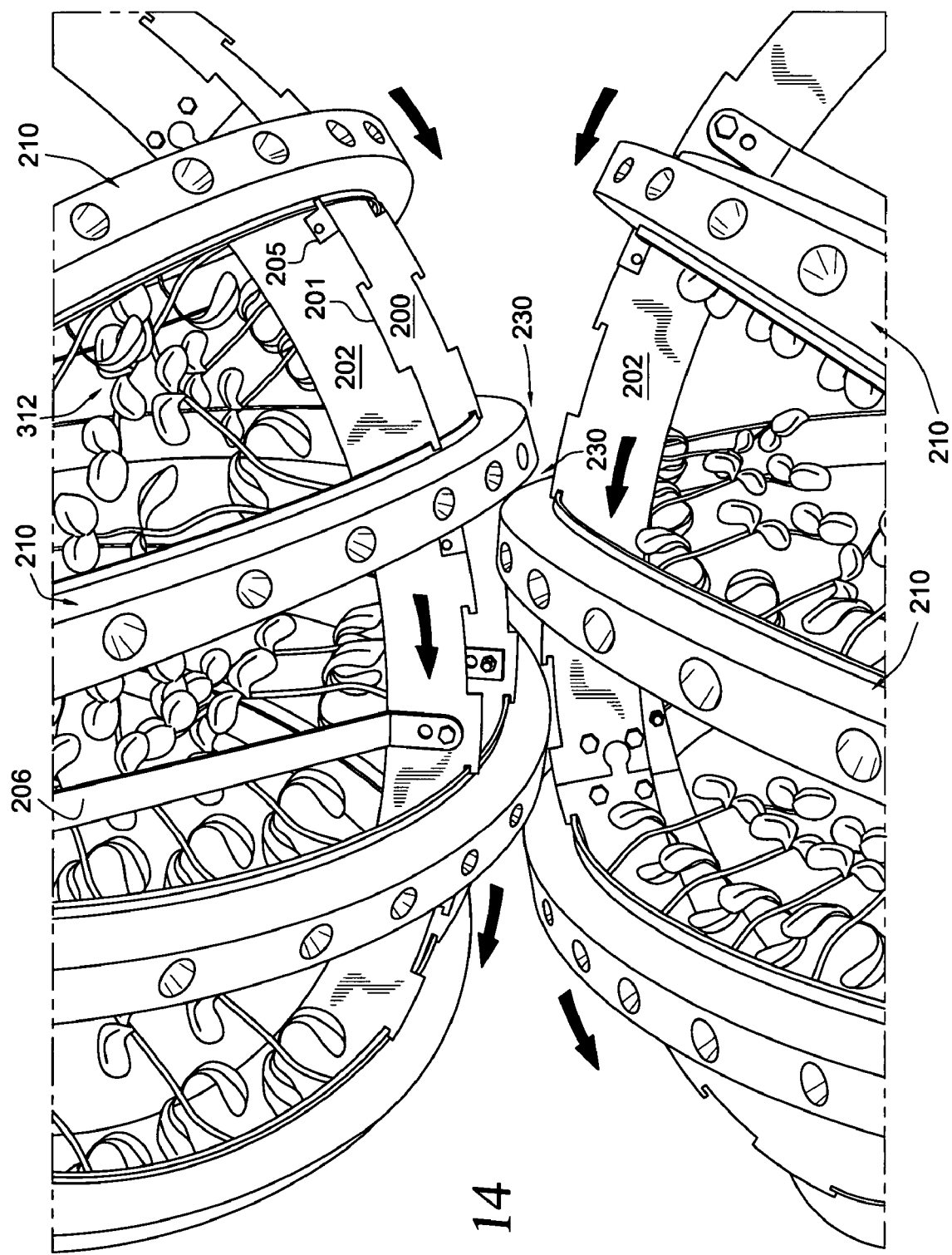
FIG. 14 is a perspective view showing portions of two open framework arrays intermeshing via their respective ribs while rotating.

Like ribs 26 and apertures 52, each rib 210 is provided with a series of spaced and tapered apertures 212 which radially face the center of the open framework array (FIG. 12). Preferably equally spaced, each aperture 212 receives a plant puck 303 and plant 301 as describer previously. If desired, peat puck 303 can be encased in open mesh fabric or netting.

It has been found that less energy is required to germinate seeds into seedlings and the preferred practice is to seed a series of side-by-side banks of ribs before mounting in an array; the seeds are quickly germinated under artificial light and are mounted to into arrays as describer herein after the seeds sprout.

Figure 15:
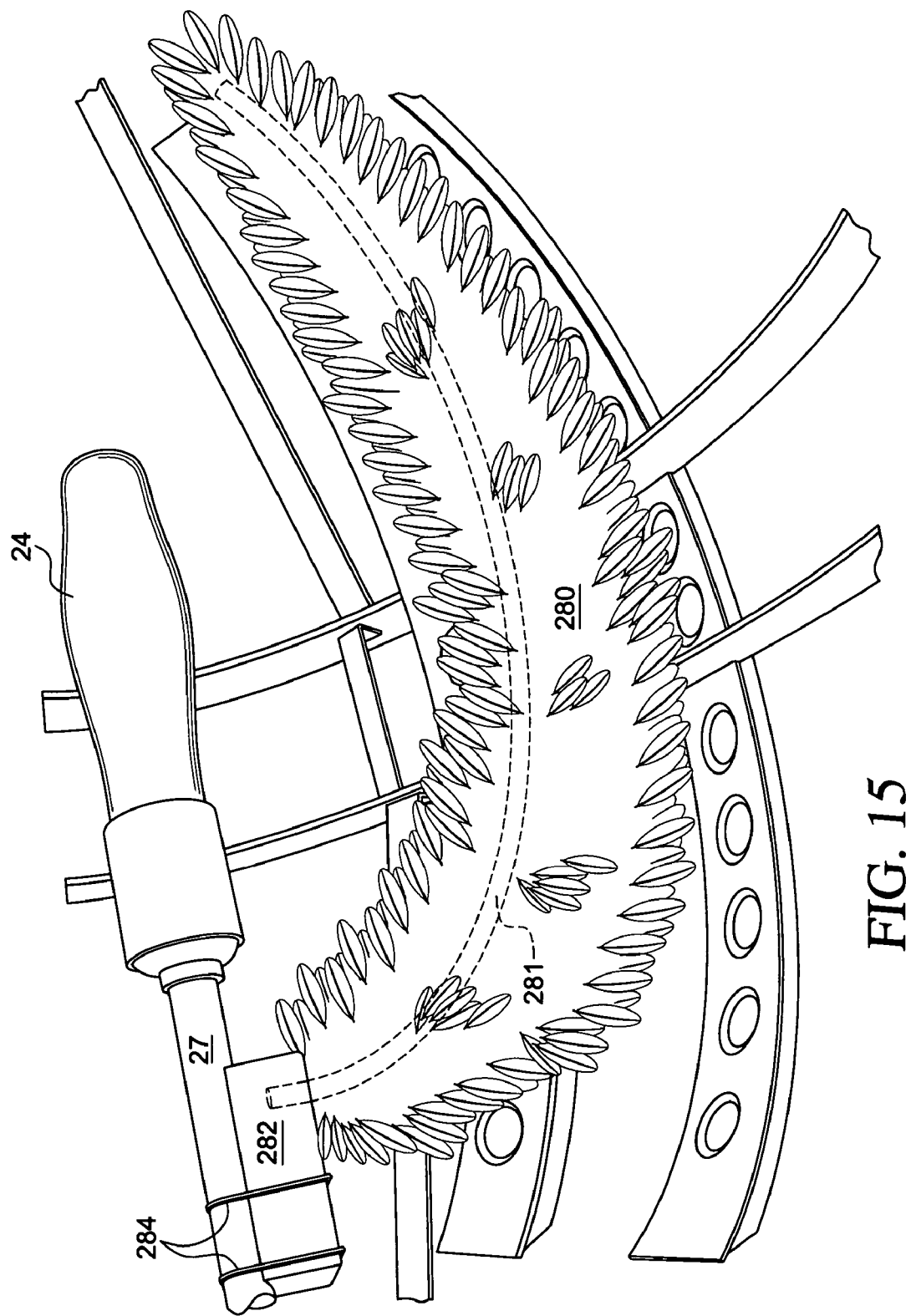
FIG. 15 is a side interior view of a pollination device in the form of an arcuate feather wand mounted to the interior of a array.

FIG. 15 shows a pollination device which can be used to advantage to pollinate growing plants like strawberries and the like. The invention allows the growth of plants that require pollination without relying on natural pollination such as from bees. In one aspect, pollination can be promoted within a array by mounting a device for gently contacting flowering plants in a rotating array so as to dislodge pollen and spread it to other flowers for cross pollination. This produces rapid and increased growth. In the embodiment illustrated, a feather-like duster 280 carried by a flexible core wire 281 is mounted to block 284 which is in turn mounted to support 27 for light source 24. The feather assembly 280 is contoured to the inner curve of ribs 26 or 210 and is positioned so as to lightly brush against the growing plants to dislodge and redistribute pollen within the array. Other similar means can be mounted for periodic or constant rotation relative to the growing plants.

In general, plants are known to respond to gravity, light and nutrients. The gravity response predominates which means plants will inherently grow against gravity even if it means growing away from a light source. Thus, plants that are inverted will turn and grow away from the source of gravity regardless of where the light is coming from.

According to the invention, the gravity response is neutralized by regulating the rotational speed of the arrays to create micro-gravity which causes the rotating plants to grow towards the central light source. Rotation of the arrays at selected rates, in effect, tricks the plants into growing towards the light source regardless of their position in the array and their rotation about its central horizontal axis.

Rotational speeds can be determined empirically and will vary between about 1 and 60 rotations per hour (rph) or between 1 and about 10 revolution per minute (rpms), preferably between about 1 and about 5 rpms, depending on the crop being grown. Thus, stunted or flat or spreading growth in a plant that normally grows upright can be corrected by increasing the rpms in increments until the plants resumes their normal growth pattern. Strawberries have been found to grow prolifically at an rpm of 0.25 with aided pollination such as illustrated in FIG. 15.

Rotational speed of the arrays, watering with nutrients, gas supply, temperature, air circulation, light source and periods of light and darkness are selected for optimum plant growth as illustrated in the examples.

Simultaneous watering insures approximately equal or even weight distribution among growing plants. This allows rotational rates as described herein and prevents unbalancing which can have an adverse effect on the operation of a carousel such as shown on FIG. 1. For example, uneven weight distribution can cause uneven bearing wear, drive motor overheating and failure, stressing of linkages, seams and joints and like problems leading to equipment breakdown and failure. Because all the plants in an array receive substantially the same light, nutrients and rotational speed, increase in weight due to plant growth is also evenly distributed thus maintaining smooth balanced rotation.

Different crops can be grown in the same array but growth rates and crop weight should be considered to maintain even weight distribution and balance. Two diverse crops with different growth rates and/or crop weights can be grown is one array without creating an imbalance by having like plants grown in opposite array quarters. For example, leaf lettuce can be grown in quarters 1 and 3 while Romaine lettuce is grown in quarters 2 and 4.

Light source 24 delivers growth promoting UV light during selected intervals to the plants growing on the interior of the arrays. The light source 24 is mounted generally at the center of each array at the end of conduit 27 (FIG. 4C) and is powered by electrical input wires 80. The light source can also extend along the horizontal axis of a array. The light source can be a fluorescent tube or tubes, a light emitting diode (LED), a high pressure sodium lamp, other metal halide lamps or an ordinary light bulb or bulbs in the center of the array.

Figure 9A:
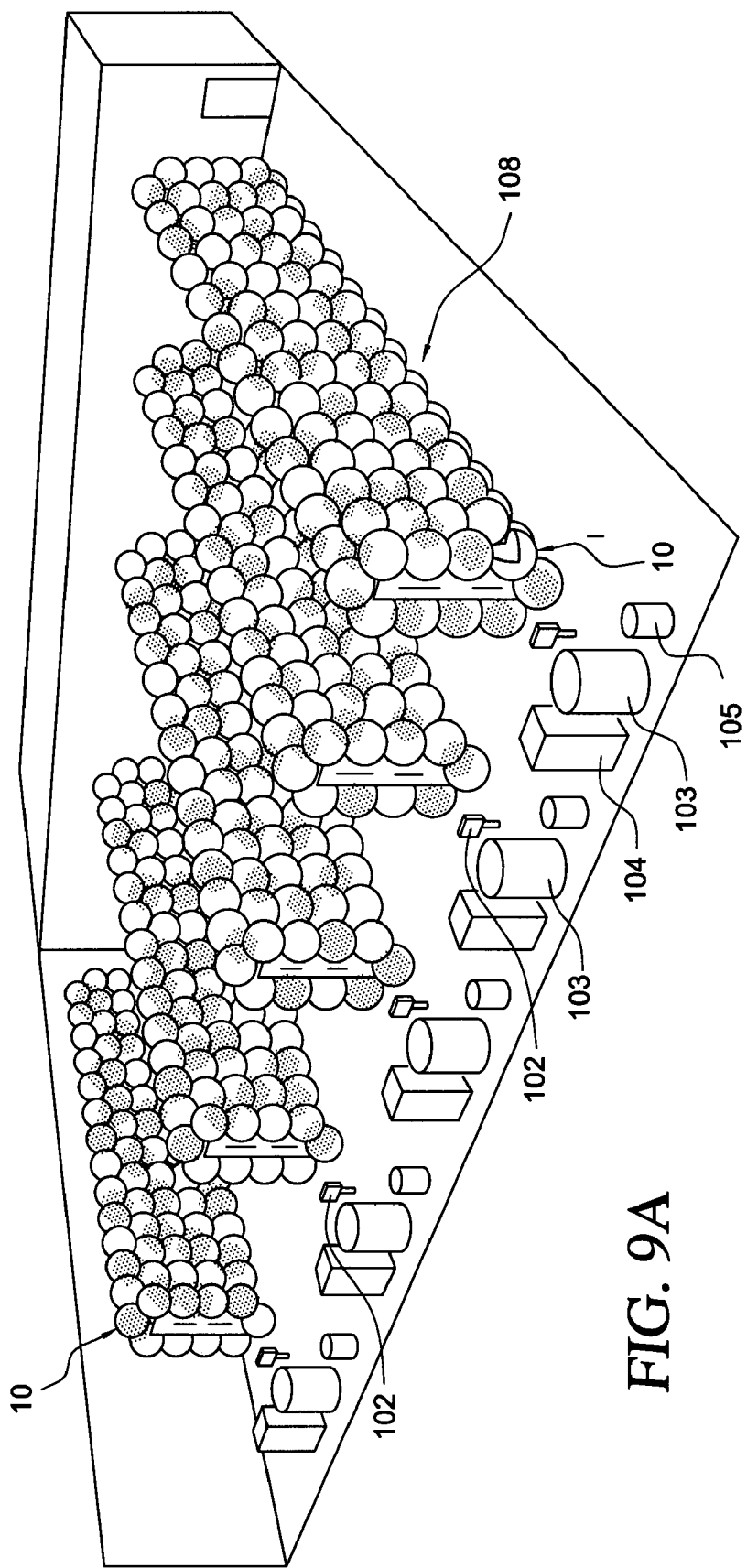
FIG. 9A is an overall perspective view of a plant utilizing carousels of the invention for carrying out the inventive method.

A typical factory for growing plants according to the invention is shown in FIG. 9A wherein carousels generally shown at 108 each containing ten arrays 10 are arranged in five rows. Tanks 103 contain water and plant nutrients which are delivered to the arrays as described herein. Electrical equipment cabinets 104 and control consoles 102 are used to select and regulate rotation speeds for the arrays in a given carousel and feed rates for water and nutrients.

Figure 9B:
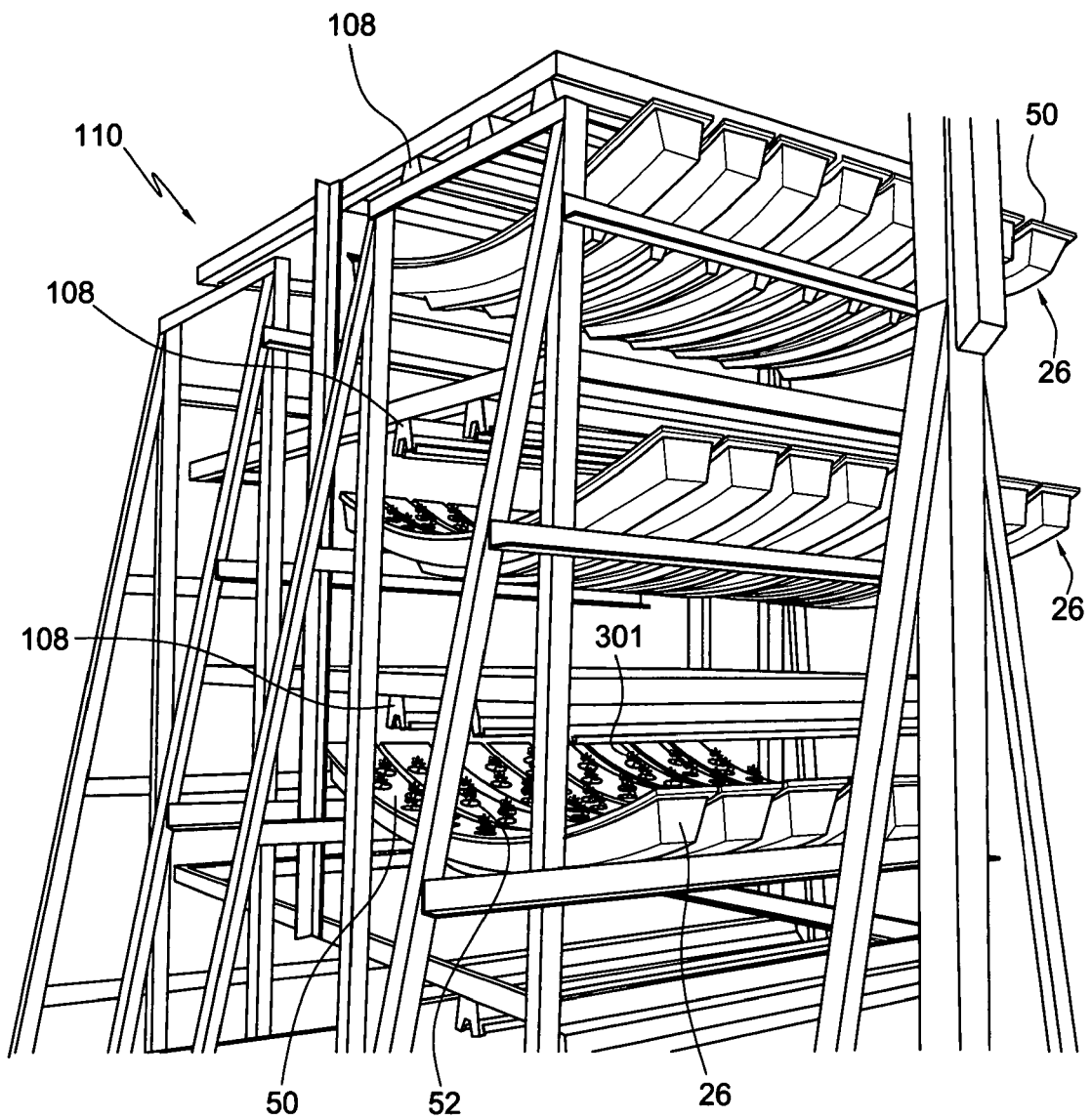
FIG. 9B is a perspective view of a mobile rack for sprouting seeds and transporting ribs from and to arrays in a carousel.
Figure 10:
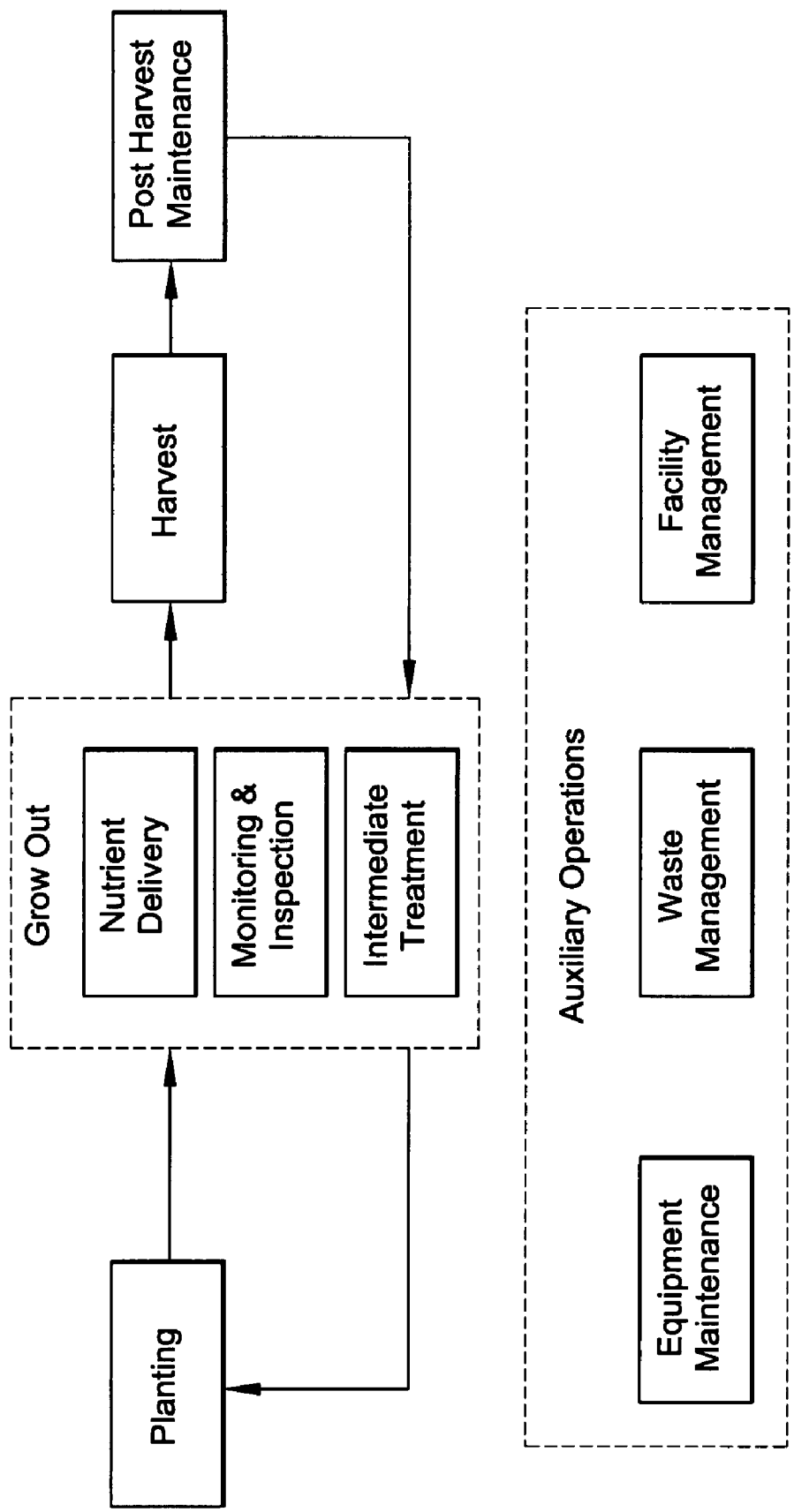
FIG. 10 is a flow diagram illustrating process flow of the plant shown in FIG. 13.

FIG. 10 illustrates the process flow for a typical plant such as shown in FIG. 9A. FIG. 9B shows mobile rack 110 for holding side-by-side ribs 26 at several levels under fluorescent lamps 108 for germinating plants 301 in plant site apertures 52 in plant holding members 50. Rack 110 can also be used to transport ribs to and from arrays in a carousel to exchange ribs for cropping and reloading.

In other embodiments, the interior of an array can be exposed to different gas mixtures. The selected gas can be carbon dioxide or oxygen and fresh batches of water and plant nutrients are preferably delivered to the growth medium without recirculation. Oxygen added to the water stimulates root growth and the injection of carbon dioxide enhances plant growth and will eliminate mites and insects if they infiltrate a array, thus eliminating the use of pesticides. The plant atmosphere, or the atmosphere in a smaller enclosure for the carousels, can be easily controlled using know methods and systems used for clean rooms and the like, for example.

Basil grown from seed and safflower seeds grown from seedlings are examples of plants that can be grown in high yields according to the invention. The invention is especially suited for growing leafy green vegetables, tomatoes, fruits and berries. The following is a representative list of crops that can be grown according to the invention:

Herbs
Aloe Vera
*Artemisia—Artemisia annua*
Basil—Ararat basil—Green Globe Basil—Sweet Salad Basil—Thai Basil
Cilantro—Spice Coriander—Santo Cilantro
*Echinacea—Echinacea purpurea*
*Eucalyptus—Eucalyptus globulus*—Peppermint *Eucalyptus*
Funnel
Golden seal
Lemon balm
Milk Thistle
Oregano—Greek Oregano—Italian Oregano—Mexican Oregano
Paprika—*Capsicum annuum*
Parsley—Aphrodite parsley—Italian Parsley—Plain parsley
Peppermint
Chile Pepper—Habanero—Jalapeno—Tabasco—Scotch Bonnet—Cayenne
Sage—Extrakta Sage—Garden Sage
St. Johns Wart
Yucca—Yucca *glauca*
Vegetables
Beans—Golden Wax—Tender green
Broccoli—De Cicco
Cauliflower—Snowball
Lettuce—Butterhead—Loose leaf—Oak leaf Red-Romaine
Spinach—Mustard—New Zealand
Peppers—Cal wonder—Golden Cal Wonder—Sweet Chocolate—Jamaican Yellow
Tomato—Roma—Sweetie—
Pea—Mammoth melting—Oregon Sugar pod—
Berries
Blueberries—wild and cultured
Strawberries—all
Cranberries
Blackberries
Raspberries
Biopharmaceuticals
Natural Biocompounds (therapeutic biocompounds native to plant species):

The plants listed below express biocompounds native to them as secondary metabolites; genetic engineering of the plants is not involved.

| Plant | Compound | Indication | Drug |
| --- | --- | --- | --- |
| Madagarascar | Vincristine | Cancer | Vincristine |
| Rosy | Vinblastine | Cancer | Vinblastine |
| Periwinkle | | Cancer | |
| | Vinorelbine | Cancer | Vindesine |
| | | Cancer | Vinflunine |
| | Ajmalicine | Hypertension | Raubasine |
| May Apple | Podophyllotoxin | Cancer | Etoposide |
| | | Cancer | Teniposide |
| | | Cancer | Etopophos |
| | | Genita warts | Podophyllotoxin |
| English Yew | 10-DAB | Cancer | Docetaxel |
| Artemisia | Artemisinin | Malaria | Artemether |
| Poppy | Morphine | Pain | Codeine |
| | | Pain | Morphine |
| | | Erectile dysf. | Apomorphine |
| | | Parkinson's | Apomorphine |
| | Thebane | Pain | Oxycodone |
| Foxglove | Digitalis | Heart Disease | Digoxin |
| Indian Snakeroot | Reserpine | Hypertension | Reserpine |
| | Ajmalicine | Hypertension | Raubasine |
| Mex. Wild Yam | Diosgenin | Inflammation | Cortisone |
| | | Hormonal imbalance | Progesterone Other steroids |

Vincristine is used to treat leukemia, non-Hodgkin's lymphoma (becoming more common as AIDS patients live longer), Kaposi's Sarcoma, breast and lung cancers and certain other cancers. Vinblastine has been used for tumor treatment, and is recommended for generalized Hodgkin's disease and resistant choricarcinoma. See, Jordan, M. A. and Wilson, L., Microtubules as a Target for Anticancer Drugs, *Nature Reviews*, 4 (April 2004) 253."

Vinblastine and vincristine used in combination chemotherapy has resulted in 80% remission in Hodgkin's disease, 99% remission in acute lymphocitic leukemia, 80% remission in Wilm's tumor, 70% remission in gestational choricarcinoma, and 50% remission in Burkitt's lymphoma. (see O'Reilly et al, National Tropical Botanical Garden website, Kalaheo, Hi.).

Transgenic or recombinant biopharmaceuticals, i.e., therapeutic biocompounds from foreign DNA inserted in a plant host such as tobacco, safflower and alfalfa can also be produced using the invention.

Recombinant biopharmaceuticals encompass a wide range of therapeutic proteins and subunit vaccines, and include biogeneric or biosimilar compounds such as insulin, erythropoietin (EPO), human growth hormone (somatropin) (hGH) and granulocyte colony-stimulating factor (G-CSF).

Natural biocompound producing plants can be grown and cultivated to advantage using the invention. Growing such plants under controlled conditions possible with the invention can result in an increase in compound expression with better consistency of expression. Moreover, purer compounds can be extracted from the plants when using the invention due to the absence of contaminants such as pesticide residues and toxins from disease and insect, bird and animal excretia found in plants grown in the field, and often in greenhouse plants.

Upon harvesting the plants cultivated using the invention, the compounds of interest can be extracted and purified using various separation technologies such as steam distillation, solvent extraction, filtration and chromatography. Examples of extraction of natural product compounds are contained in King, M. B. & Bott, T. R., eds., *Extraction of Natural Products Using Near Critical Solvents*, Glasgow: BlackieAcademic & Professional (1993). An example of a chromatography process for purifying proteins from transgenic tobacco is described by Holler, Vaughan and Zhang, "Polyethyleneimine Precipitation Versus Anion Exchange Chromatography in Fractionating Recombinant Glucuronidase from Transgenic Tobacco Extract", *Journal of Chromatography A*, 1142 (2007) 98-105.

Each array is preferably 48 inches in diameter but can be built in any size, however. For developmental purposes 48 inches provides for ease of use and ensures that plants are not required to stretch for light source. Arcuate ribs are preferably made of UV protected ABS plastic.

Light emitting diodes are preferred as the light source because they allow remote control of the spectrum of light within the array to accommodate and control specific stages of plant growth and development. LED's draw approximately 25% less power than fluorescent lamps. This makes the use of solar power feasible which is especially beneficial in remote regions.

Heat build up in the arrays, which normally operate at room temperature, can be controlled by regulating the interior temperature of the plant enclosure.

The ability to confine the entire system allows for minimal or no product loss from rodents or insects. Plants are less likely to contract viruses than on the ground. A controlled environment allows the plants to grow in a sterile atmosphere reducing bacterial and pest infestation without the use of poisons or other insecticides or fungicides. The arrays are self pollinating for fruits and vegetables that require pollination. This is accomplished as shown in FIG. 15 or by simply rotating the arrays; pollen will fall and land on the other plants. No bees are needed.

In one aspect, the invention increases the amount of growing space for a given footprint. For example, in a 12,000 square foot plant as shown in FIG. 9, the actual footprint of the carousels is 6,000 square feet. This equals 50,000 square feet of level growing space.

Water can be processed through a reverse osmosis tank to recycle the fertilizer. No soil depletion takes place and no crop rotation is required.

The invention is especially useful is providing a local source of fresh vegetables and fruit with low capital investment. Shipping costs are minimized and use of the arrays is not restricted by region or growing season: any location with a supply of water and power is suitable. Plants can be grown in accelerated growing cycles to meet everyday food needs as well as specialized requirements for specific needs such as by nutraceutical companies. World hunger needs can be addressed locally and high quality seedlings can be grown locally or on site for reforestation purposes. The demand for organically grown products is also met not only for foods but also for nonfood products like cosmetics and like products.

The invention also offers environmental advantages such as reduced fossil fuel use in transporting product to market, energy efficiency, reduced and negligible nutrient pollution, elimination of the use of toxic pesticides and fertilizers, controlled and reduced water usage and the reuse of abandoned or idle facilities.

EXAMPLES

The invention will now be illustrated by several examples which are not intended to limit or restrict the invention in any way In examples 1-3, using the embodiment illustrated in FIGS. 11-14, the GroTek Complete Feed Program, available from GroTek Manufacturing, Inc. 284-505-8840-210th Street, Langley, B.C. V1M 2Y2, Canada was used.

General information is available from the GroTek Web site, which can be located by searching on, for example, the Google database under "Gro Tek".

Mixing charts for the Feed Program are available from Gro Tek or its Web site (can be located by searching on, for example, the Google database under "Gro Tek").

Components of the Feed Program used in these examples are as follows:

1. Fertilizers

For germination—GroTek Kick Start rooting solution 1-2-1 (these numbers refer to the parts of nitrogen-phosphorus-potassium, or N-P-K, in each formulation).

Formulations for GroTek's Tek.123 fertilizers are given below; other formulations are available from the manufacturer.

| Grow | | Bloom | |
|---|---|---|---|
| Tek.123 Grow 1 | 4-0-6 | Tek.123 Grow 1 | 4-0-6 |
| Tek.123 Micro 2 | 3-0-2 | Tek.123 Micro 2 | 3-0-2 |
| Tek.123 Bloom 3 | 0-6-5 | Tek.123 Bloom 3 | 0-6-5 |

2. Supplements

| Grow | | Bloom | |
|---|---|---|---|
| Bud Fuel | 0-0-2 | Bud Fuel | 0-0-2 |
| Monster Grow | 20-40-0 | Vita Max | 1-1-2 |
| Organic Fusion Grow | 1-0-2 | Monster Bloom | 0-50-30 |

-continued

2. Supplements

| Grow | | Bloom | |
|---|---|---|---|
| Rage | 1-0-0 | Blossom Blaster | 0-39-25 |
| LXR Gold | 0-1-0 | Organic Fusion Bloom | 0-1-2 |
| | | Heavy Bud | 0-1-2 |
| | | Rage | 1-0-0 |
| | | LXR Gold | 0-1-1 |
| | | Formula 1 | 0-2-4 |

3. Conditioners

| Grow | Bloom |
|---|---|
| Hydrozyme | Hydrozyme |
| Final Flush | MM 2000 |
| | Final Flush |

Fertilizers, supplements, and conditioners were mixed according to the manufactures recommendations available from Gro Tek or its Web site (can be located by searching on, for example, the Google database under "Gro Tek").

Examples 1-3 followed the manufactures feed program protocol.

Example 2 (basil) was repeated and the mixture of supplements was altered as indicated. Examples 1-3 were carried out in arrays and ribs depicted in FIGS. 11-14 and Examples 4-6 were carried out in arrays and ribs depicted in FIGS. 4-8.

GroTek Fertilizer Formulations:

TEK.123 Grow 1

| | |
|---|---|
| Total nitrogen | 4% |
| 3.7% nitrate nitrogen | |
| 0.3% ammoniacal nitrogen | |
| Soluble potash | 6% |
| Magnesium (Mg) | 0.5% |
| Mixed at 15 ml/gallon | |

TEK.123 Micro 2

| | |
|---|---|
| Total nitrogen | 3.0% |
| 2.8% nitrate nitrogen | |
| 0.2% ammoniacal nitrogen | |
| Soluble potash | 2.0% |
| Calcium (Ca) | 3.0% |
| Iron (Fe) | 0.2% |
| 0.2% chelated iron | |
| Manganese (Mn) | 0.05% |
| 0.05% chelated Mn | |
| Boron (B) | 0.02% |
| Mixed at 10 ml/gallon | |

TEK.123 Bloom 3

| | |
|---|---|
| Available phosphoric acid | 6.0% |
| Soluble potash | 5.0% |
| Magnesium (Mg) | 0.5% |
| Sulfur (S) | 3.0% |
| Mixed at 5 ml/gallon | |

Example 1

Arugula

General Conditions

All water was taken from the reverse osmosis water purification system.

All water was treated with 2 ml/L food grade hydrogen peroxide and left to sit 20 minutes before any fertilizer is mixed.

Flush for 12 hours with fresh water between week fertilizer changes.

Carbon dioxide was set at 1500 ppm/24 hours a day during the first 16 days and 1200 ppm/16 hours a day for all 25 days in the array. Carbon dioxide was run only while the lights were on.

For seed sprouting used GroTek Kick Start fertilizer. For growing used GroTek's complete GroTek feed program.

Planting

Day 1—Mixed fertilizer with water at a dilution rate of 389 ppm; Adjusted the solution to a 5.8 pH. Re-hydrate from the bottom using fresh water only. Adjusted the pH to 5.8. The peat pucks should be moist but not soaking wet. Once the peat pucks are no longer moist to the touch re-hydrate using the same solution as Day 1.

Transplanting

Day 16—Fill each rib with 12 plants. Do this 32 times for each array to be used. Attach the water lines and install a 400-Wait High Pressure Sodium lamp. Adjusted the ambient temperature so the inside of the array 10" above lamp is 76 F during the day and 68 F at night. Set photoperiod at 14 hours. A pump rated at 1350 GPM High Pressure is used for all watering times listed.

In the Array

Day 1-7 Mixed water and nutrients for week one and diluted to 300 ppm. Raised the ppm to a max of 450 ppm over week one. Adjusted the pH to 6.1 set the timer to run the pump 0.5 seconds the first time the system is engaged and then once 36 hours later at a rate of 0.12 seconds. Then run the pump 0.13 seconds every hour during the day and 0.1 seconds three times during the night.

Day 8-15 Mixed water and nutrients for week two and diluted to 450 ppm. Raised to a max of 600 ppm over week 2. Adjusted the pH to 6.2 set the timer to run the pump 0.13 seconds every hour during the day and 0.1 seconds three times during the night.

Day 16-21 Mixed water and nutrients for week three and diluted to 600 ppm. Raised to a max of 720 ppm over the week. Adjusted the pH to 6.4 set the timer to run the pump 0.19 seconds every hour during the day and 0.19 seconds every 140 minutes during the night.

Day 22-24 Mixed water and nutrients for week three and diluted to 720 ppm. Adjusted the pH to 6.4. On Day 23 did not add micronutrients. Set the timer to run the pump 1.20 seconds every hour during the day and 0.19 seconds every 140 minutes during the night.

Day 25—Mixed GroTek's The Final Flush fertilizer rinse solution at a rate of 10 ml per 5 liters of water. Adjusted the pH to 6.2 set the timer to run the pump 1.10 seconds every hour during the day and 0.19 seconds every 140 minutes during the night.

Harvest

Trimmed plants to 2.5" from the top of the peat puck holder to allow for re-growth. Start back on a day seven feeding schedule for the first seven days and continued the regular feeding schedule after this period.

Example 2

Sweet Basil

General Conditions

All water was taken from the reverse osmosis water purification system

All water was treated with 2 ml/L food grade hydrogen peroxide and left to sit 20 minutes before any fertilizer is mixed.

Flush for 12 hours with fresh water between week fertilizer changes

Carbon dioxide was set at 1500 ppm/24 hours a day during the first 16 days and 1200 ppm/16 hours a day for all 25 days in the array. Carbon dioxide was run only while the lights were on.

For seed sprouting used GroTek Kick Start fertilizer. For growing used GroTek's complete GroTek feed program Planting Day 1—Mixed fertilizer with water at a dilution rate of 389 ppm; Adjusted the solution to a 5.8 pH. Re-hydrate from the bottom using fresh water only. Adjusted the pH to 5.8. The peat pucks should be moist but not soaking wet. Once the peat pucks are no longer moist to the touch re-hydrate using the same solution as Day 1.

Transplanting

Day-16 Hydrated 192 peat pucks for each array to be transplanted. Inserted one peat puck into one peat puck holder. Inserted six plants into a mechanical medium starting at the water injection end of each rib. Filled the first hole with a plant leaving one open hole between each plant. Filled each open hole with one peat puck holder from the freshly hydrated peat pucks. This will be known as m1. Did this 16 times for each arrays used. Next, inserted six of the freshly hydrated peat pucks in the peat puck holders into the mechanical medium starting at the rib end the water is injected into. Leave one open hole between each. Filled the open holes with a plant. This will be known as m2. Did this 16 times for every array to be used. Attach the mediums to a array frame using an alternating pattern of m1, m2. Attached the water lines and installed a 1000-Watt high pressure sodium lamp. Adjusted the ambient temperature of the inside of the array 10" above the lamp at 80 F during the day and 68 F at night. The photoperiod was set at 16 hours. A pump rated at 1350 GPH High Pressure is used for all watering times listed.

In the Array

Day 1-7 Mixed water and nutrients for week one and diluted to 389 ppm raising the ppm to 500 over the 7 days. Keep the pH at 6.2 run the pump 0.13 seconds every hour during the day and 0.1 seconds three times during the night Day 8-15 Mixed water and nutrients for week two and diluted to 500 ppm and raised to a max of 800 ppm over the 7 days. Keep the pH at 6.3 run the pump 0.18 seconds every hour during the day and 0.15 seconds three times during the night Day 16-21 Mixed water and nutrients for week three diluted to 800 ppm and raised to a max of 880 ppm over the 7 days. Keep the pH at 6.4 run the pump 0.19 seconds every hour during the day and 0.19 seconds every 140 minutes during the night Day 22-24 Mixed water and nutrients for week three and diluted to 850 ppm. On Day 23 did not add micronutrients. Set the timer to run the pump 1.20 seconds every hour during the day and 0.19 seconds every 140 minutes during the night run the pump 1.20 seconds every hour during the day and 0.19 seconds every 140 minutes during the night.

Day-25 Mixed GroTek's The Final Flush fertilizer rinse solution at a rate of 10 ml per 5 liters of water. Adjusted the pH to 6.2 set the timer to run the pump 1.10 seconds every hour during the day and 0.19 seconds every 140 minutes during the night.

Example 2 followed GroTek's protocol including Monster Grow supplement during week one, two Tek.123 fertilizer mixes for the first 16 days and then Bud Fuel supplement for the remaining time. Example 2 was repeated altering the GroTek protocol by using Monster Grow supplement for the first five days, Bud Fuel supplement for the next three days and then back to Monster Grow for the next five days. On day thirteen the supplements were once again switched to Bud Fuel for three days then back to Monster Grow for final four days. Crop yield for the second run of Example 2 was 7.4 pounds of fresh basil in 20 days with an average weight of 25.25 g per plant compared to 6.7 pounds of basil after 25 days with an average weight of 21 g per plant for the first run.

Example 3

Red Oak Leaf Lettuce

General Conditions

All water was taken from the reverse osmosis water purification system

All water was treated with 2 ml/L food grade hydrogen peroxide and left to sit 20 minutes before any fertilizer is mixed.

Flush for 12 hours with fresh water between week fertilizer changes

Carbon dioxide was set at 1500 ppm/24 hours a day during the first 16 days and 1200 ppm/16 hours a day for all 25 days in the array. Carbon dioxide was run only while the lights were on.

For seed sprouting used GroTek Kick Start fertilizer. For growing used GroTek's complete GroTek feed program.

Planting

Day 1—Mixed fertilizer with water at a dilution rate of 389 ppm; Adjusted the solution to a 5.8 pH. Re-hydrate from the bottom using fresh water only. Adjusted the pH to 5.8. The peat pucks should be moist but not soaking wet. Once the peat pucks are no longer moist to the touch re-hydrate using the same solution as Day 1.

Transplanting

Day-16 Hydrated 192 peat pucks for each array to be transplanted. Inserted one peat puck into one peat puck holder. Inserted six plants into a mechanical medium starting at the water injection end of each rib. Filled the first hole with a plant leaving one open hole between each plant. Filled each open hole with one peat puck holder from the freshly hydrated peat pucks. This will be known as m1. Did this 16 times for each arrays used. Next, inserted six of the freshly hydrated peat pucks in the peat puck holders into the mechanical medium starting at the rib end the water is injected into. Leave one open hole between each. Filled the open holes with a plant. This will be known as m2. Did this 16 times for every array to be used. Attach the mediums to a array frame using an alternating pattern of m1, m2. Attached the water lines and installed a 1000-Wait high pressure sodium lamp. Adjusted the ambient temperature of the inside of the array 10" above the lamp at 80 F during the day and 68 F at night. The photoperiod was set at 16 hours. A pump rated at 1350 GPH High Pressure is used for all watering times listed.

In the Array

Day 1-7 Mixed water and nutrients for week one and diluted to 300 ppm. Raised to a max of 500 ppm over the week. Adjusted the pH to 5.8 set the timer to run the pump 0.5 seconds the first time the system is engaged and then once 36 hours later at a rate of 0.12 seconds. Run the pump 0.13 seconds every hour during the day and 0.1 seconds three times during the night.

Day 8-15 Mixed water and nutrients for week two and diluted to 560 ppm. Raised to a max of 600 ppm over the week. Adjusted the pH to 5.9 set the timer to run the pump 0.18 seconds every hour during the day and 0.15 seconds three times during the night set the timer to run the pump 0.15 seconds every hour during the day and 0.13 seconds every 140 minutes during the night.

Day 16-21 Mixed water and nutrients for week three and diluted to 620 ppm. Raised to a max of 800 ppm over the week. Adjusted the pH to 5.9 set the timer to run the pump 0.19 seconds every hour during the day and 0.19 seconds every 140 minutes during the night.

Day-22 to 23 Mixed water and nutrients for week three and diluted to 800 ppm. Adjusted the pH to 5.9. On Day 23 did not add micronutrients. Set the timer to run the pump 1.20 seconds every hour during the day and 0.19 seconds every 140 minutes during the night.

Day-24 Used water only. Adjusted the pH to 5.8 set the timer to run the pump 1.20 seconds every hour during the day and 0.00 seconds during the night.

Day-25 Mixed GroTek's Final Flush fertilizer rinse solution at a rate of 10 ml per 5 liters of water. Adjusted the pH to 5.8 set the timer to run the pump 1.10 seconds every hour during the day and 0.19 seconds every 140 minutes during the night.

Summary

Examples 1-3

| Crop | Days to Harvest | Yield |
|---|---|---|
| Basil | 25 days in the array | 6.7 lbs. |
| Arugula | 25 days in the array | 5 lbs. |
| Red Leaf Lettuce | 25 days in the array | 24 lbs. |

Example 4

Honeoye Strawberry

The fertilizer mixture used in this example is a proprietary fertilizer protocol detailed in an email dated Apr. 18, 2006 from Tule Quach of Mastronardi Produce Ltd., 2100 Road 4 East, Kingsville, ON N9Y2E5, Canada. The fertilizer is available from Mastronardi Produce and contains nitrates and sulfates of calcium and potassium and compounds of iron, magnesium, zinc, copper and sodium.

Filtered water and the proprietary fertilized protocol were mixed to an electrical conductivity [EC] of 1.5. The pH was adjusted to between 5.0 and 5.5 and this mixture was from planting to harvest.

General Conditions

All water was treated with 2 ml food grade hydrogen peroxide and left to sit 20 minutes before adding the fertilizer.

Carbon dioxide levels were set to 1800 ppm.

For the first seven days the plants were grown under fluorescent lights. The photo period was 9 hours For the flowering cycle in the array, the plants were under a 600-watt high pressure sodium light [HPS]. The photo period was 16 hours.

A 1350 GPM high pressure pump was used for all watering times listed.

Array rotation was set at one full rotation every 46 minutes.

Planting

Day 1—fertilizer and water were mixed to an EC of 1.5 and a pH of 5.2 and used to hydrate Cocoa filled arcuate ribs and 224 peat pucks. A hole was made through each peat puck and a plant was stuffed through each until the crown was just above the top of the peat puck. Fourteen pucks with plants were inserted into plant site apertures in the faces of sixteen ribs. The plants were sprayed with a solution of 3% hydrogen peroxide daily for the first seven days and allowed to grow as described above under General Conditions before mounting in four arrays each having 16 ribs.

In the Array

Day 7—Switched the light and light cycle as described above under General Conditions and mounted the ribs into four intermeshing arrays.

Days 8-10 the plants were fed for 2 seconds 6 times a day.

Days 11-21 the plants were fed for 2.5 seconds 4 times a day. Days 22-28 the plants were fed 3.5 seconds 8 Times a day. Days 29-43 the plants were fed for 2.5 seconds 17 times a day. Days 44 to 55 the plants were fed for 3 seconds 17 times a day. Days 56 to 77 the plants were watered for 4 seconds 18 times a day.

Time Line

First flower—day 16; first berry—day 34; last berry harvested—day 77.

Harvest

Berries were harvested for 43 days with berry sizes from 8 g to 26 g. The average brixs test reading was 7.9.

Example 5

Loose Leaf Lettuce

Lettuce Fertilizer Mix (See L. Morgan, Hydroponic Lettuce Production, Casper Publications Pty Ltd (A.C.N. 67064 029 303) PO box 225, Narrabeen NSW 2101 Australia. Published 1999, reprinted 2003. (ISBN 0-9586735-2-7) Page 81.)

| Tank A - 100 liters filtered water | Grams added |
|---|---|
| Calcium Nitrate | 7549 |
| Iron EDTA | 260 |

| Tank B - 100 liters filtered water | |
|---|---|
| Potassium Nitrate | 1703 |
| Mono Potassium Phosphate | 1198 |
| Magnesium Sulfate | 2571 |
| Copper Sulfate | 2 |
| Manganese Sulfate | 41.7 |
| Zinc Sulfate | 2.6 |
| Boric Acid | 25 |
| Ammonium Molybdate | 1.02 |

General Conditions

All water was treated with 2 ml food grade hydrogen peroxide and left to sit 20 minutes before adding the fertilizer.

Carbon dioxide levels were set to 800 ppm.

A 1350 GPM high pressure pump was used for all watering times listed.

For the growing cycle in the array, the plants were under a 250-watt high pressure sodium light. The photo period was 16 hours Array rotation was set at one full rotation every 42 minutes.

Planting

The plants were seeded into 112 peat pucks and set under 24 hours of fluorescent light for twelve days to yield sprouted plants.

Transplanting

Day 12—a water/fertilizer mixture at an EC of 0.3 and a pH of 5.8 was added to peat containing 40% Perlite. Sixteen ribs were filled with this mix and 8 sprouted plant pucks were inserted in plant site apertures on the face of each rib leaving one hole empty between each plant; the empty holes were filled with hydrated peat pucks. One array of 16 ribs was used in this example.

In the Array

Day 13-18 the plants were fed with a water fertilizer mixture at an EC of 0.3 and a pH of 5.9 for 5 seconds once a day.

Day 19-32 the plants were fed at an EC of 0.45 and a pH of 6.1 for 5 seconds twice a day.

Day 33-39 the plants were fed at an EC of 0.65 and a pH of 6.1 for 5 seconds twice a day Day 40-46 the plants were fed at an EC of 0.75 and a pH of 6.1 for 3 seconds four times a day.

Day 47-56 the plants were fed at an EC of 1.0 and a pH of 6.1 for 3 seconds four times each day.

Harvest

Harvested 14.7 lbs of leaf lettuce from 97 heads. The plants were 43 days in the array.

Example 6

Madagascar Periwinkle (*Catharanthus roseus* (L.) G.Don)

| Gro Tek Fish Plus 5-1-1 | |
|---|---|
| Total Nitrogen | 5% |
| 0.1% Nitrate Nitrogen | |
| 0.3% Ammoniacal Nitrogen | |
| 4.6% Organic slowly available Nitrogen | |
| Available Phosphoric acid | 1% |
| Soluble potash | 1% |

| GroTek Soil Zyme 3-1-2 | |
|---|---|
| Total Nitrogen | 3% |
| 0.5% Ammoniacal Nitrogen | |
| 1% Nitrate Nitrogen | |
| 1.5% slowly available Organic Nitrogen | |
| Available phosphate | 1% |
| Soluble Potash | 1% |

General Conditions

All water was treated with 2 ml food grade hydrogen peroxide and left to sit 20 minutes before adding the fertilizer.

Carbon dioxide levels were set to 1100 ppm.

A 1350 GPM high pressure pump was used for all watering times listed.

For the growth cycle in the array, the plants were under a 600-watt high pressure sodium light. The photo period was 16 hours Array rotation was set at one full rotation every 48 minutes.

Planting

Day-1 Seeds were planted into 180 peat pucks hydrated with Fish Plus at 50 ppm and a pH of 5.6. The pucks were kept darkness for 14 days. After 6 days the first plants started to sprout and continued until day 14 when 138 plants had germinated.

Transplant

Day-14 Cocoa was mixed with 40% Perlite and 5 g of Soil Zyme per gallon of the Cocoa mixture. This mixture was hydrated with 50 ppm of Fish Plus at a pH of 5.6 and used to fill sixteen ribs. Germinated plant pucks were inserted into plant site apertures in the face of 16 ribs at various densities per rib [14 in three ribs, 10 in three and 8 in ten]. All empty plant sites were filled with hydrated peat pucks. One array was used in this example.

In the Array

Day-21 first set of true leaves open.

Day-26 second set of leaves opened.

Day 27-31 Plants were misted with 3% water daily.

Day 31 Plants were watered 1.5 gallons at 100 ppm fertilizer at a pH of 5.6. (to correct plant yellowing and shut down due to drying of the media and an increase in pH which has caused an iron deficiency).

Day 33 Plants watered with 1.5 gallons fresh water at a pH of 4.

Day 34 Plants watered with 3 gallons fresh water at a pH of 4.

Day 37 Plants watered with 5 gallons fresh water at a pH of 4.

Day 38 Plants watered with 3 gallons fresh water at a pH of 4.

Day 39 Plants watered with 5 gallons fresh water at a pH of 4.

Day 40 Plants watered with 3 gallons fresh water containing 100 ppm fertilizer at a pH of 4.

Day 43 Plants watered with 3 gallons fresh water at a pH of 4.

Day 44 Plants watered with 5 gallons fresh water containing 100 ppm fertilizer at a 5.2 pH.

Day 46 Plants watered with 3 gallons fresh water at a pH of 4.

Day 48 Plants watered with 3 gallons fresh water at a pH of 4.

Day 50 Plants watered with 5 gallons fresh water containing 100 ppm fertilizer at a 5.2 pH.

Plants are harvested on day 70 with expected yields of 0.0005%-0.3% by weight for Vinblastine, Vincristine and ajmalicine. See Datta et al, Phytochemistry, 46, No. 1, pp. 135-7 (1997) and C. W. T. Lee-Parsons, Producing Valuable Pharmaceutical Compounds from Cell Cultures of the Madagascar Periwinkle Plant.

While this invention has been described as having preferred sequences, ranges, steps, materials, structures, features, and/or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the appended claims.

What is claimed is:

1. A method for growing plants, which comprises:
   (a) providing a vertical carousel of contiguous, intermeshing horizontal arrays capable of moving together, each of said arrays comprising a plurality of spaced apart arcuate ribs arranged around a common horizontal axis, said ribs carrying plants that grow towards a growth promoting light source at the center of each array which is operable during periods of plant growth and non-growth, the ribs of one array intermeshing with the spaced apart ribs of contiguous arrays
   (b) rotating one of said arrays thereby causing all of the contiguous intermeshing arrays to rotate together at the same speed;
   (c) moving the arrays in the carousel together from a drive position in which said one array is rotated to an unloading/loading position in which said one array is not rotated; and
   (d) watering all the plants in an array at the same time while the arrays are rotating to maintain even weight distribution within each array for smooth, balanced rotation.

2. The method of claim 1, wherein said carousel moves in a noncircular path.

3. The method of claim 1, wherein the rate of rotation and the intervals, amounts and rates of delivery of water optionally containing plant nutrients are selected for optimum plant growth towards said light source.

4. The method of claim 1, wherein the light source is a light emitting diode.

5. The method of claim 1, wherein the plants grown are selected from the group of leafy vegetables, green vegetables, fruits, berries and natural biocompound producing plants.

6. The method of claim 1, wherein the plants grown are selected from the group of basil, safflower, Arugula, Artemisia, lettuce, spinach, strawberries, Periwinkle, May apple, English Yew, Poppy, Foxglove, Indian Sankeroot and yam.

7. The method of claim 1, wherein pollen is dislodged from flowering plants and distributed to other flowering plants in an array.

8. An apparatus for growing plants, comprising:
   (a) a vertical carousel of contiguous, intermeshing horizontal arrays capable of moving together, each of said arrays comprising a plurality of spaced apart arcuate ribs arranged around a common horizontal axis, said ribs carrying plants that grow towards a growth promoting light source at the center of each array which is operable during periods of plant growth and non-growth, the ribs of one array intermeshing with the spaced apart ribs of contiguous arrays;
   (b) means to rotate one of said arrays thereby causing all of the contiguous intermeshing arrays in the carousel to rotate together at the same speed;
   (c) means to move the arrays in the carousel together from a drive position in which said means to rotate said one array is engaged to an unloading/loading position in which said means to rotate is disengaged; and
   (d) means to water all the plants in an array at the same time while the arrays are rotated to maintain even weight distribution within each array for smooth, balanced rotation.

9. The apparatus of claim 8, wherein said carousel moves in a noncircular path.

10. The apparatus of claim 8, wherein the light source is a light emitting diode.

11. The apparatus of claim 8, which includes means to dislodge and distribute pollen from flowering plants to other flowering plants in a spherical array.

12. A method for growing plants, wherein:
   (a) a vertical carousel of contiguous, intermeshing horizontal arrays capable of moving together is provided, each of said arrays carrying plants on the interior thereof that grow towards a growth promoting light source at the center of each array which is operable during periods of plant growth and non-growth, the exteriors of one array being adapted to intermesh with the exteriors of contiguous arrays;
   (b) one of said arrays is rotated thereby causing all of the intermeshing arrays to rotate together at the same speed;
   (c) the arrays are moved in the carousel together from a drive position in which said one array is rotated to an unloading/loading position in which said one array is not rotated; and
   (d) all the plants in an array are watered at the same time while the arrays are rotating to maintain even weight distribution within each array for smooth, balanced rotation;
   (e) using each of said arrays by providing a plurality of spaced apart arcuate ribs arranged around a common horizontal axis, the ribs of one array intermeshing with the spaced apart ribs of contiguous arrays.

13. The method of claim 12, wherein said carousel moves in a noncircular path.

14. An apparatus for growing plants, comprising:
   (a) a vertical carousel of contiguous, intermeshing horizontal arrays capable of moving together, each of said arrays carrying plants on the interior thereof that grow towards a growth promoting light source at the center of each array which is operable during periods of plant growth and non-growth, the exteriors of each array intermeshing with contiguous arrays;

(b) means to rotate one of said arrays thereby causing all of the contiguous intermeshing arrays in the carousel to rotate together at the same speed;

(c) means to move the arrays in the carousel together from a drive position in which said means to rotate said one array is engaged to an unloading/loading position in which said means to rotate is disengaged; and (d) means to water all the plants in an array at the same time while the arrays are rotated to maintain even weight distribution within each array for smooth, balanced rotation;

(e) said arrays comprise a plurality of spaced apart arcuate ribs arranged around a common horizontal axis, the ribs of one array intermeshing with the spaced apart ribs of contiguous arrays.

15. The apparatus of claim 14, wherein said carousel moves in a noncircular path.

* * * * *